(12) United States Patent
Wecker et al.

(10) Patent No.: US 6,289,464 B1
(45) Date of Patent: *Sep. 11, 2001

(54) RECEIVING WIRELESS INFORMATION ON A MOBILE DEVICE WITH REDUCED POWER CONSUMPTION

(75) Inventors: Dave Wecker, Bothell; John Mark Miller, Kirkland; Michael J. O'Leary; David Tuniman, both of Redmond; Vinay Deo, Bellevue; Don Kadyk, Bothell; Dennis Cronin, Bellevue, all of WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/189,024

(22) Filed: Nov. 10, 1998

Related U.S. Application Data

(60) Provisional application No. 60/070,720, filed on Jan. 7, 1998, and provisional application No. 60/075,123, filed on Feb. 13, 1998.

(51) Int. Cl.[7] ................................. G06F 1/32; H04Q 7/00
(52) U.S. Cl. ..................... 713/300; 713/310; 713/320; 340/825.69; 340/825.72
(58) Field of Search ..................................... 713/300, 310, 713/320, 323; 709/217; 710/3, 106; 379/41; 370/278; 375/220; 455/31.1, 11.1, 89; 340/825.44, 311.1, 825.72, 825.69

(56) References Cited

U.S. PATENT DOCUMENTS

Re. 35,590 * 8/1997 Bezos .
4,593,155 * 6/1986 Hawkins ............................. 455/411

(List continued on next page.)

FOREIGN PATENT DOCUMENTS

| 0 434 231 A2 | 6/1990 | (EP) . |
| 0 653 736 A1 | 5/1995 | (EP) . |
| 0 704 827 A1 | 4/1996 | (EP) . |
| 0 803 825 A2 | 4/1997 | (EP) . |
| WO 9013213 * | 1/1990 | (WO) ............................. H04Q/7/02 |
| 95/12955 | 5/1995 | (WO) . |
| 97/17682 | 5/1997 | (WO) . |
| 97/35402 | 9/1997 | (WO) . |

OTHER PUBLICATIONS

"Dynamic Documents: Mobile Wireless Access to the WWW", M. Frans Kaashoek, et al., *IEEE,* Dec. 8, 1994, pp. 179–184.

Jason Levitt, "Push Your Web Pages—Netscape's Netcaster and Microsoft's CDF make it easier than ever to join the push revolution", Information Week, No. 634, Jun. 9, 1997, XP002103295.

(List continued on next page.)

*Primary Examiner*—Gopal C. Ray
(74) *Attorney, Agent, or Firm*—Westman, Champlin & Kelly, P.A.

(57) ABSTRACT

A system and method for receiving wireless information on a portable computing device includes powering a wireless receiver only from a battery of the portable computing device. Receiving wireless information and storing the wireless information in memory of the wireless receiver. The wireless receiver wakes up a processor of the portable computing device when the wireless information fills a threshold of the memory available in the wireless receiver. The wireless information is then transferred from the memory of the wireless receiver to the memory of the portable computing device.

58 Claims, 11 Drawing Sheets

U.S. PATENT DOCUMENTS

| | | | |
|---|---|---|---|
| 4,704,735 | * 11/1987 | Swapp et al. | 455/68 |
| 4,713,808 | 12/1987 | Gaskill et al. | 370/94 |
| 4,916,637 | 4/1990 | Allen et al. | 364/513 |
| 5,014,345 | 5/1991 | Comroe et al. | 455/54 |
| 5,043,721 | * 8/1991 | May | 340/825.44 |
| 5,367,667 | 11/1994 | Wahlquist et al. | 395/575 |
| 5,400,331 | 3/1995 | Lucak et al. | 370/85.1 |
| 5,473,607 | 12/1995 | Hausman et al. | 370/85.13 |
| 5,559,800 | 9/1996 | Mousseau et al. | 370/85.13 |
| 5,603,025 | 2/1997 | Tabb et al. | 395/602 |
| 5,619,615 | 4/1997 | Pitchaikani et al. | 395/11 |
| 5,619,694 | 4/1997 | Shimazu | 395/615 |
| 5,623,656 | 4/1997 | Lyons | 395/610 |
| 5,640,590 | 6/1997 | Luther | 395/806 |
| 5,659,298 | 8/1997 | Brooks et al. | 340/825.44 |
| 5,675,780 | 10/1997 | Plant-Mason et al. | 395/606 |
| 5,675,831 | 10/1997 | Caputo | 395/830 |
| 5,680,585 | 10/1997 | Bruell | 395/500 |
| 5,701,451 | 12/1997 | Rogers et al. | 395/600 |
| 5,705,995 | 1/1998 | Laflin et al. | 340/825.44 |
| 5,740,549 | 4/1998 | Reilly et al. | 705/14 |
| 5,742,833 | 4/1998 | Dea et al. | 395/750.05 |
| 5,752,202 | 5/1998 | Obright | 455/574 |
| 5,793,756 | * 8/1998 | Ayerst et al. | |
| 5,796,952 | 8/1998 | Davis et al. | 395/200.54 |
| 5,799,151 | 8/1998 | Hoffer | 395/200.34 |
| 5,809,247 | 9/1998 | Richardson et al. | 395/200.48 |
| 5,860,153 | 1/1999 | Matena et al. | 711/216 |
| 5,861,883 | 1/1999 | Cuomo et al. | 345/326 |
| 5,875,306 | 2/1999 | Bereiter | 395/200.5 |
| 5,884,097 | 3/1999 | Li et al. | 395/863 |
| 5,892,979 | * 4/1999 | Shiraki et al. | |
| 5,920,696 | 7/1999 | Brandt et al. | 395/200.48 |
| 5,923,738 | 7/1999 | Cardillo, IV et al. | 379/93.25 |
| 5,935,060 | 8/1999 | Iliff | 600/300 |
| 5,937,041 | 8/1999 | Cardillo, IV et al. | 379/93.25 |
| 5,946,326 | 8/1999 | Rinne | 370/486 |
| 5,953,523 | 9/1999 | Martinez | 395/701 |
| 5,963,944 | 10/1999 | Adams | 707/10 |
| 5,974,085 | 10/1999 | Smith | 375/222 |
| 5,974,238 | 10/1999 | Chase, Jr. | 395/200.78 |
| 6,005,490 | 12/1999 | Higashihara | 340/825.72 |
| 6,041,183 | 3/2000 | Hayafune et al. | 395/712 |
| 6,076,044 | * 6/2000 | Brown. | |

OTHER PUBLICATIONS

Oliverio, G., "A Paging HPC", Handheld Systems, Creative Digital Publishing Inc., (retrieved from Internet Jun. 10, 1999), No. 5.4, Jul. 1997–Aug. 1997, XP002106345.

"Extending HTML in a principled way with displets", by Favio fitli, Chao–Min Chiu, Michael Bieber, *Computer Networks and ISDM Systems,* vol. 29, No. 8–13, Sep. 1, 1997, pp. 1115–1128.

Scardinal, M., "The PageCard SDK", Handheld Systems, Creative Digital Publishing Inc., (retrieved from Internet Jun. 6, 1999), No. 5.6, Nov. 1997–Dec. 1997, XP002106346.

Salampasis, M. et al., "Hyper Tree: A Structural Approach to Web Authoring", Software–Practice and Experience, vol. 27, No. 12, Dec. 1, 1997, pp. 1411–1426, XP000726053.

Castedo Ellerman, "Channel Definition Format (CDF)", Channel Definition Format Submission 970309, Mar. 10, 1998, XP002103294.

"Minstrel Plus™" brochure, for Novatel Wireless, Inc. copyright 1998.

* cited by examiner

| | ADDRESS | OPERATIONAL STATUS | PRIORITY STATUS |
|---|---|---|---|
| 150 | ADDRESS 1 | ENABLED | ENABLED |
| | ADDRESS 2 | ENABLED | DISABLED |
| | ADDRESS 3 | ENABLED | DISABLED |
| | ADDRESS 4 | DISABLED | DISABLED |
| | ADDRESS 5 | DISABLED | DISABLED |

RECEIVING WIRELESS INFORMATION ON A MOBILE DEVICE WITH REDUCED POWER CONSUMPTION

CROSS REFERENCE TO RELATED TO APPLICATIONS

Reference is hereby made to U.S. Patent application, Ser. No. 09/107,724, filed Jun. 30, 1998, entitled "SYSTEM AND METHOD FOR RECEIVING WIRELESS INFORMATION ON A MOBILE DEVICE", now abandoned; and co-pending U.S. Pat. application Ser. No. 09/107,666, filed Jun. 30, 1998, entitled "SYSTEM FOR DELIVERING DATA CONTENT OVER A LOW BIT RATE TRANSMISSION CHANNEL", which have all been assigned to the same Assignee as the present invention and are hereby fully incorporated by reference.

The present application is based on provisional application Serial No. 60/070,720 filed on Jan. 7, 1998, and on provisional application Serial No. 60/075,123 filed on Feb. 13, 1998.

BACKGROUND OF THE INVENTION

The present invention relates to personal mobile computing devices commonly known as handheld portable computers. More particularly, the present invention relates to a system and method for receiving wireless information on a mobile device.

Mobile devices are small electronic computing devices often referred to as personal digital assistants. Many of such mobile devices are handheld devices, or palm-size devices, which comfortably fit within the hand. One commercially available mobile device is sold under the trade name Hand-Held PC (or H/PC) having software provided by Microsoft Corporation of Redmond, Wash.

Generally, the mobile device includes a processor, random access memory (RAM), and an input device such as a keyboard and a display, wherein the keyboard can be integrated with the display, such as a touch sensitive display. A communication interface is optionally provided and is commonly used to communicate with a desktop computer. A replaceable or rechargeable battery powers the mobile device. Optionally, the mobile device can receive power from an external power source that overrides or recharges the built-in battery, such as a suitable AC or DC adapter, or a powered docking cradle.

In one common application, the mobile device is used in conjunction with the desktop computer. For example, the user of the mobile device may also have access to, and use, a desktop computer at work or at home. The user typically runs the same types of applications on both the desktop computer and on the mobile device. Thus, it is quite advantageous for the mobile device to be designed to be coupled to the desktop computer to exchange information with, and share information with, the mobile device.

Another technique for providing information to the mobile device is described in the above-identified co-pending U.S. Patent applications. Generally, the method and system described therein allow the mobile device to receive information over a wireless, low bit-rate channel or transport, such as a pager network. For example, such information can include electronic mail or news, weather, sports, traffic and local event information typically obtained from a desktop computer connected to the Internet.

However, the limited battery power available on the mobile device can present significant obstacles in transferring information using the wireless low bit-rate channel. For example, the mobile device should be able to receive information over the wireless transport at any time. However, if the mobile device was merely left on, awaiting information to be received, the battery for the mobile device would be quickly depleted. This method of operation would require the user to constantly recharge or replace the battery.

Alternatively, a wireless receiver on the mobile device can turn on the mobile device when it detects that information is being sent to the mobile device. However, if large amounts of information are being transmitted over the wireless transport, the wireless receiver can turn on the mobile device so often that again the battery for the mobile device can be quickly depleted.

Another drawback of most wireless receivers for a mobile device is that the wireless receiver requires its own battery, separate from the battery used on the mobile device since the mobile device can be turned off at any time. This increases the size, weight and cost of the wireless receiver as well as complicates use for the user since he must maintain both batteries.

There is a continuing need to improve wireless communication with a mobile device. In particular, there is a need to efficiently process information transmitted over a wireless channel to the mobile device in order to conserve battery resources on the mobile device.

SUMMARY OF THE INVENTION

A system and method for receiving wireless information on a portable computing device includes powering a wireless receiver only from a battery of the portable computing device. Receiving wireless information and storing the wireless information in memory of the wireless receiver. The wireless receiver wakes up a processor of the portable computing device when the wireless information fills a threshold of the memory available in the wireless receiver. The wireless information is then transferred from the memory of the wireless receiver to the memory of the portable computing device.

Another aspect of the present invention is a wireless receiver for use in a portable computing device. The wireless receiver includes a radio receiver for receiving wireless information, memory for storing the wireless information and a processor for analyzing the wireless information. The radio receiver, the memory and the processor are powered only from the portable computing device.

Another aspect of the present invention includes a method for receiving wireless information on a portable computing device, wherein the wireless information is transmitted to the portable computing device with respect to wireless addresses. The method includes providing a list of wireless addresses on the portable computing device. Each wireless address corresponds to selected information to be received. Each wireless address also includes an associated status entry indicating enablement of the wireless address. The method further includes selectively enabling and disabling the status entry for the wireless address to allow receipt of the corresponding information as a function of an operating parameter of the device. In one exemplary embodiment, the operating parameter indicates when the portable computing device is being powered or connected to an external source such as a power docking cradle.

Further features of the present invention include a system and method for receiving wireless information on a portable computing device that includes receiving an information packet having a first portion with topic information indicative of content, and a second portion having the content of the information packet. The first portion of the information packet is compared to content filtered data stored on a portable computing device. At least the second portion of the information packet is forwarded to another component of the portable computing device if the first portion matches any of the content filtered data.

DETAILED DESCRIPTION OF THE PREFERRED EMBODIMENTS

Figure 1:
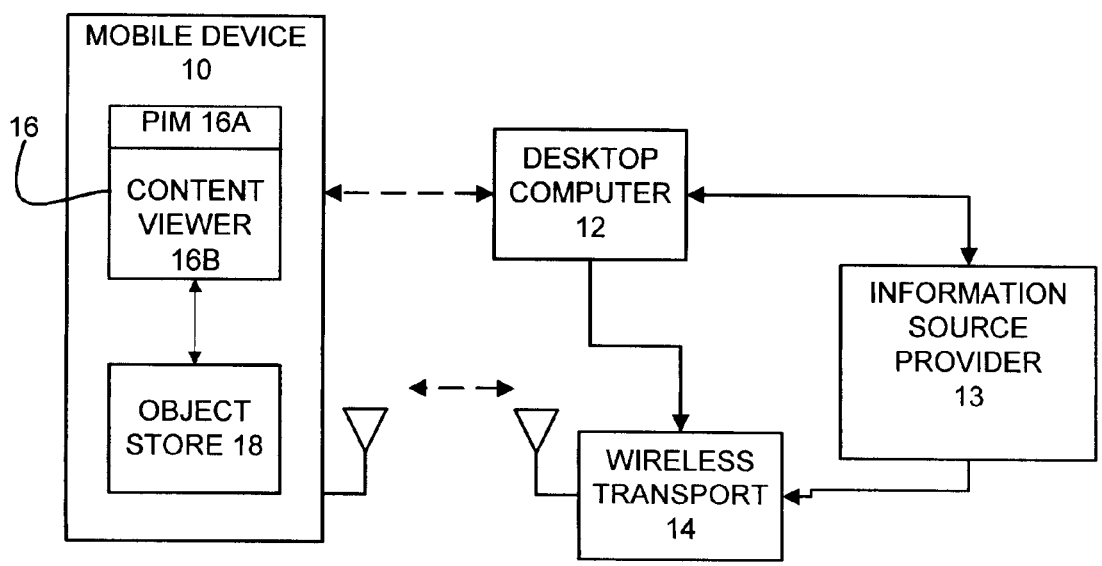
FIG. 1 is a simplified block diagram illustrating one embodiment of a mobile device in accordance with the present invention.

FIG. 1 is a block diagram of an exemplary portable computing device, herein a mobile device 10 in accordance with the present invention. FIG. 1 illustrates that, in one preferred embodiment, the mobile device 10 is suitable for connection with, and to receive information from, a desktop computer 12, a wireless transport 14, or both. The wireless transport 14 can be a paging network, cellular digital packet data (CDPD), FM-sideband, or other suitable wireless communications. However, it should also be noted that the mobile device 10 may not be equipped to be connected to the desktop computer 12, and the present invention applies regardless of whether the mobile device 10 is provided with this capability.

In any case, the mobile device 10 preferably includes one or more application programs 16 and an object store 18. The application programs 16 can be, for example, a personal information manager (PIM) 16A that stores objects related to a user's electronic mail (e-mail) and scheduling or calendaring information. The application programs 16 can also include a content viewer 16B that is used to view information obtained from a wide-area network (WAN), such as the Internet. In one embodiment, the content viewer 16B is an "offline" viewer in that information is stored primarily before viewing, wherein the user does not interact with the source of information in real time. However, it should be understood that the present invention can be implemented in a real time environment wherein the wireless transport 14 provides two-way communication.

The wireless transport 14 is used to send information to the mobile device 10 for storage in the object store 18 and for use by the application programs 16. The wireless transport 14 receives the information to be sent from an information source provider 13, which, for example, can be a source of news, weather, sports, traffic or local event information. Likewise, the information source provider 13 can receive e-mail and/or scheduling information from the desktop computer 12 to be transmitted to the mobile device 10 through the wireless transport 14. The information from the desktop computer 12 can be supplied to the information source provider 13 through any suitable communication link, such as a direct modem connection. In another embodiment, the desktop computer 12 and the information source provider 13 can be connected together forming a local area network (LAN) or a wide area network (WAN). Such networking environments are commonplace in offices, enterprise-wide computer network Intranets and the Internet. If desired, the desktop computer 12 can also be directly connected to the wireless transport 14.

The object store 18 is preferably configured to store a plurality of individual records or objects, each comprising a plurality of fields or properties related to features of PIM 16A, or to data viewable on the content viewer 16B. For example, where PIM 16A is an e-mail and scheduling program, object store 18 is configured to store objects, each of which has a plurality of properties which can be associated with e-mail, scheduling or calendaring features provided by PIM 16A.

It is also worth noting that, in one embodiment, the mobile device 10 can be coupled to the desktop computer 12 using any suitable, and commercially available, communication link and using a suitable communications protocol. For instance, in one embodiment, the mobile device 10 communicates with the desktop computer 12 with a physical cable which communicates using a serial communications protocol. Other communication mechanisms include infra-red (IR) communication and direct modem communication.

It is also worth noting that the mobile device 10, in one embodiment, can be synchronized with the desktop computer 12. In that instance, properties of objects stored in object store 18 are similar to properties of other instances of the same objects stored in the object store 18 on the desktop computer 12 or on the mobile device 10. Thus, for example, when one instance of an object stored in the object store 18 on the desktop computer 12, the second instance of that object in the object store 18 of the mobile device 10 is updated the next time the mobile device 10 is connected to the desktop computer 12 so that both instances of the same object contain up-to-date data. This is commonly referred to as synchronization.

In order to accomplish synchronization, synchronization components run on both the mobile device 10 and the desktop computer 12. The synchronization components communicate with one another through well defined interfaces to manage communication and synchronization.

Figure 2:
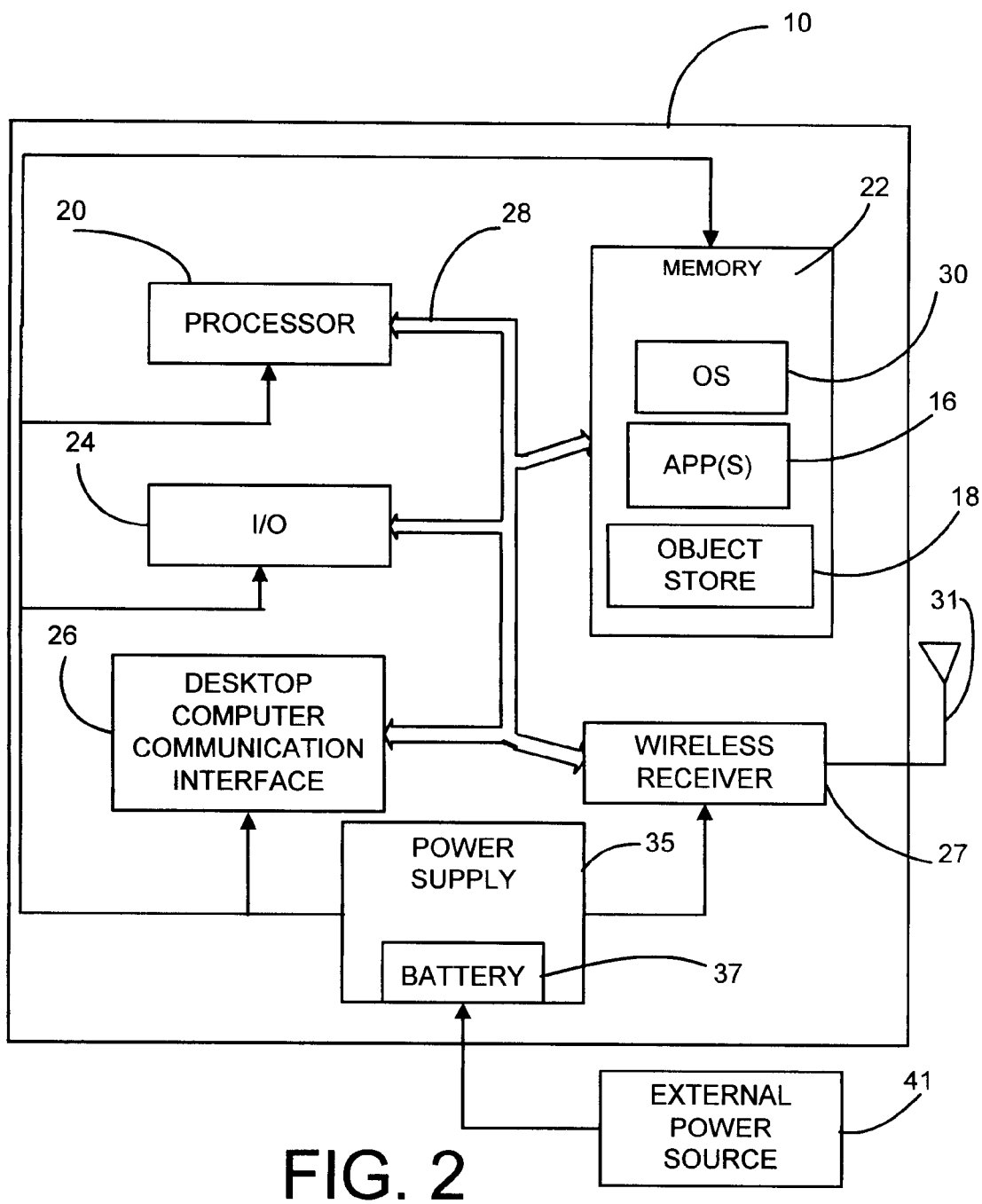
FIG. 2 is a more detailed block diagram of one embodiment of the mobile device shown in FIG. 1.

FIG. 2 is a more detailed block diagram of the mobile device 10. The mobile device 10 includes a processor 20, memory 22, input/output (I/O) components 24, a desktop computer communication interface 26 and a wireless receiver 27. In a preferred embodiment, these components of the mobile device 10 are coupled for communication with one another over a suitable bus 28.

Memory 22 is preferably implemented as non-volatile electronic memory such as random access memory (RAM) with a battery back-up module (not shown) such that information stored in memory 22 is not lost when the general power to the mobile device 10 is shut down. A portion of memory 22 is preferably allocated as addressable memory for program execution, while the remaining portion of memory 22 is preferably used for storage, such as to simulate storage on a disk drive.

Memory 22 includes an operating system 30, the application programs 16 (such as PIM 16A discussed with respect to FIG. 1), as well as the object store 18. During operation, the operating system 30 is preferably loaded into, and executed by, the processor from memory 22. The operating system 30, in one preferred embodiment, is a "WINDOWS CE" brand operating system commercially available from Microsoft Corporation. The operating system 30 is preferably designed for mobile devices, and implements features which can be utilized by PIM 16A and content viewer 16B through a set of exposed application programming interfaces and methods. The objects in object store 18 are preferably maintained by PIM 16A, content viewer 16B and the operating system 30, at least partially in response to calls to the exposed application programming interfaces and methods.

The I/O components 24, in one preferred embodiment, are provided to facilitate input and output operations from the user of the mobile device 10. The I/O components 24 are described in greater detail with respect to FIGS. 3 and 4.

The desktop computer communication interface 26 is optionally provided as any suitable, and commercially available, communication interface. The interface 26 is used to communicate with the desktop computer 12, as described with respect to FIG. 1.

The wireless receiver 27 receives information from the information source provider 13 and includes an antenna 31. The wireless receiver 27 is coupled to the bus 28 for communication with the processor 20 and the object store 18 to store information received from the wireless transport 14 in a manner described below.

A power supply 35 includes a battery 37 for powering the mobile device 10. The power supply 35 communicates with the processor 20 to control power provided to the above-described components. One aspect of the present invention is that the power supply 35 provides all power for the mobile device 10, including the wireless receiver 27 without the need for an external battery as typically found in the prior art. In a second aspect of the present invention, components of the mobile device 10, such as the I/O components 24, are provided power only when necessary to process the incoming information. This aspect of the present invention is discussed below in greater detail.

Optionally, the mobile device 10 can receive power from an external power source 41 that overrides or recharges the built-in battery 37. For instance, the external power source 41 can include a suitable AC or DC adapter, or a power docking cradle for the mobile device 10.

Figure 3:
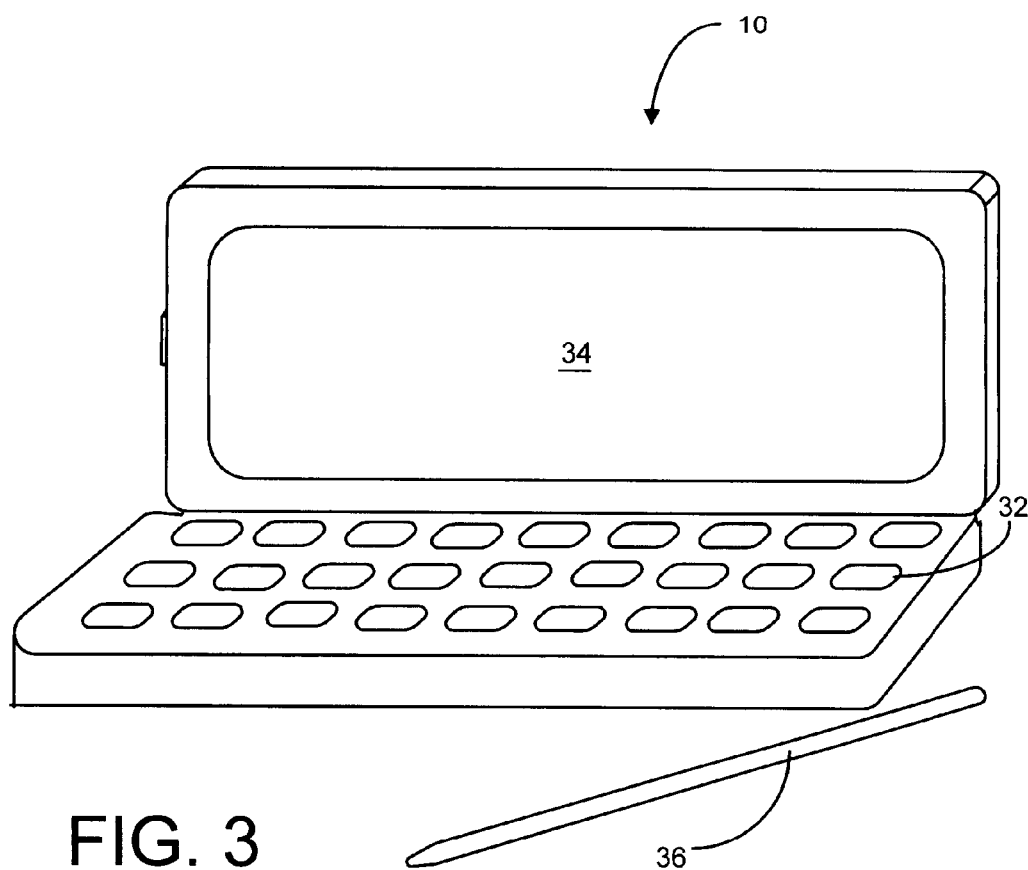
FIG. 3 is a simplified pictorial illustration of one embodiment of the mobile device in accordance with the present invention.

FIG. 3 is a simplified pictorial illustration of one preferred embodiment of the mobile device 10 which can be used in accordance with the present invention. The mobile device 10, as illustrated in FIG. 3, can be a desktop assistant sold under the designation H/PC having software provided by the Microsoft Corporation. In one preferred embodiment, the mobile device 10 includes a miniaturized keyboard 32, a display 34 and a stylus 36. In the embodiment shown in FIG. 3, the display 34 is a liquid crystal display (LCD) which uses a contact sensitive display screen in conjunction with the stylus 36. The stylus 36 is used to press or contact the display 34 at designated coordinates to accomplish certain user input functions. The miniaturized keyboard 32 is preferably implemented as a miniaturized alpha-numeric keyboard, with any suitable and desired function keys which are also provided for accomplishing certain user input functions.

Figure 4:
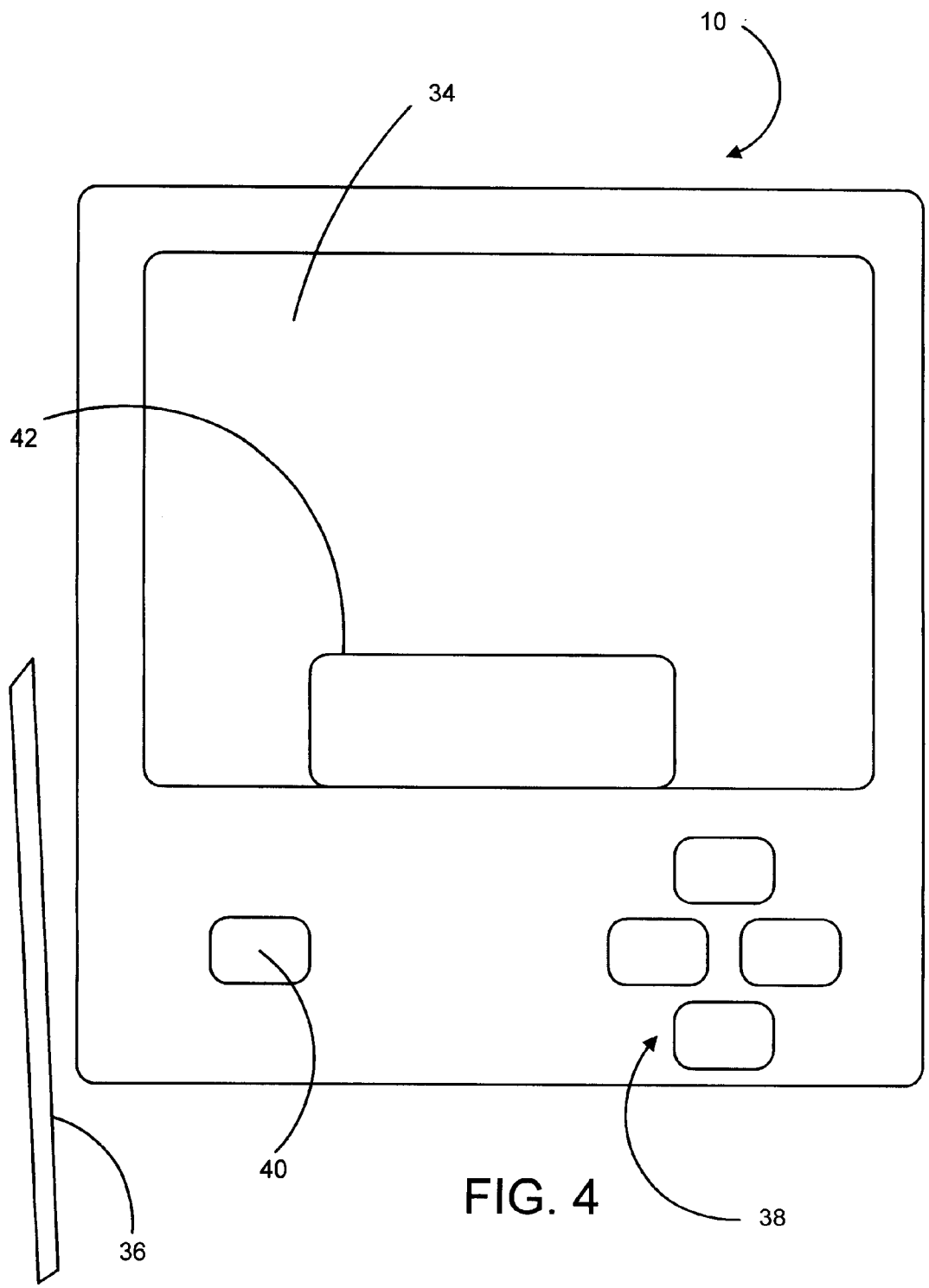
FIG. 4 is a simplified pictorial illustration of another embodiment of the mobile device in accordance with the present invention.

FIG. 4 is another simplified pictorial illustration of the mobile device 10 in accordance with another preferred embodiment of the present invention. The mobile device 10, as illustrated in FIG. 4, includes some items which are similar to those described with respect to FIG. 3, and are similarly numbered. For instance, the mobile device 10 as shown in FIG. 4, also includes the touch sensitive display 34 which can be used, in conjunction with the stylus 36, to accomplish certain user input functions. It should be noted that the display 34 for the mobile devices shown in FIGS. 3 and 4 can be the same size, or of sizes, but will typically be much smaller than a conventional display used with a desktop computer. For example, the display 34 shown in FIGS. 3 and 4 may be defined by a matrix of only 240×320 coordinates, or 160×160 coordinates, or any other suitable size.

The mobile device 10 shown in FIG. 4 also includes a number of user input keys or buttons (such as scroll buttons 38) which allows the user to scroll through menu options or other display options which are displayed on display 34, without contacting the display 34. In addition, the mobile device 10 shown in FIG. 4 also preferably includes a power button 40 which can be used to turn on and off the general power to the mobile device 10.

It should also be noted that in the embodiment illustrated in FIG. 4, the mobile device 10 includes a handwriting area 42. Handwriting area 42 can be used in conjunction with the stylus 36 such that the user can write messages which are stored in memory 22 for later use by the mobile device 10. In one preferred embodiment, the handwritten messages are simply stored in handwritten form and can be recalled by the user and displayed on the display 34 such that the user can review the handwritten messages entered into the mobile device 10. In another preferred embodiment, the mobile device 10 is provided with a character recognition module such that the user can enter alpha-numeric information into the mobile device 10 by writing that alpha-numeric information on the area 42 with the stylus 36. In that instance, the character recognition module in the mobile device 10 recognizes the alpha-numeric characters and converts the characters into computer recognizable alpha-numeric characters which can be used by the application programs 16 in the mobile device 10.

Although illustrated in FIGS. 3 and 4 as a handheld portable computer, it should be understood that the present invention can be used in other forms of portable computing devices such as pagers, laptops, computers designed for use in automobiles, and portable phones having computers.

Figures 5, 8:
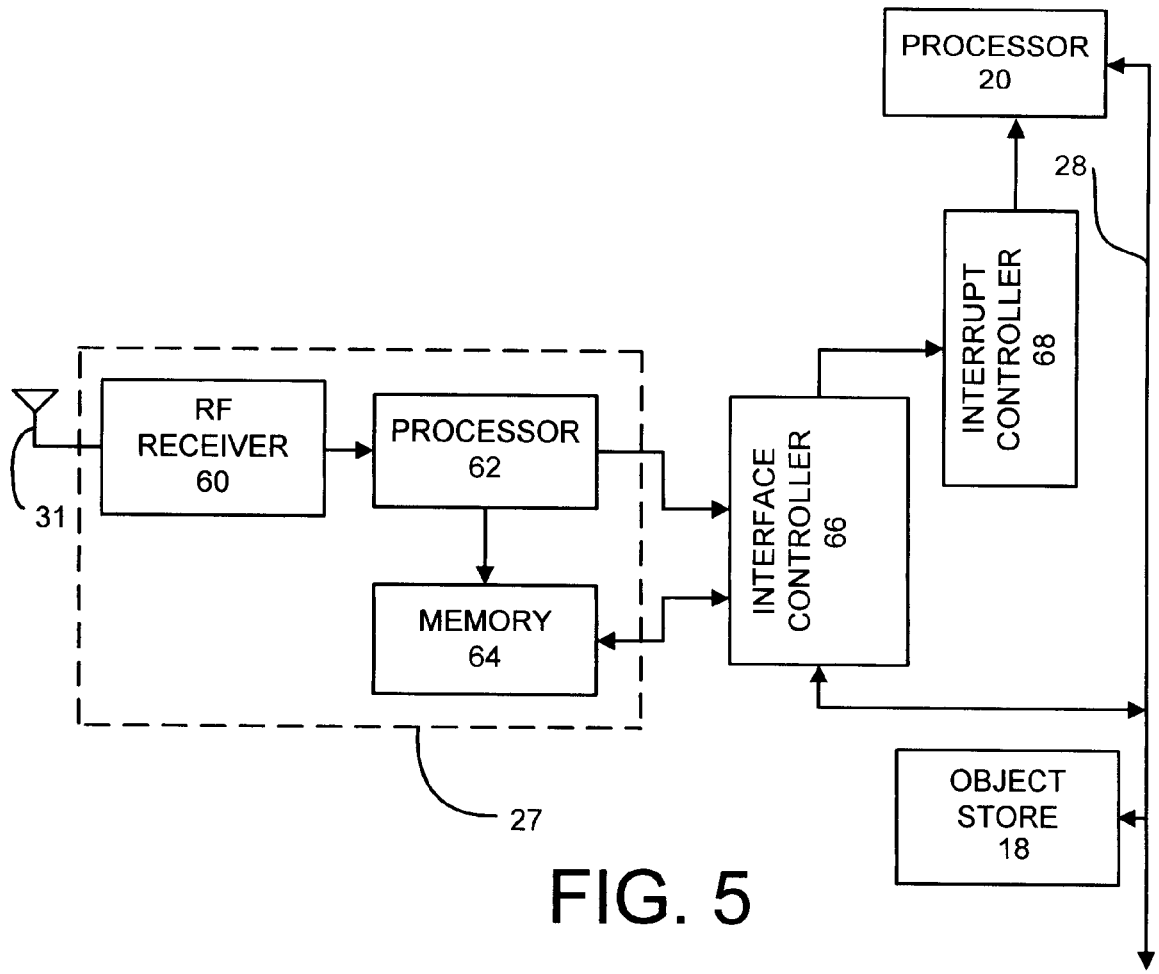
FIG. 5 is a simplified schematic illustration of a wireless receiver in accordance with the present invention.
FIG. 8 is a pictorial representation of a list of wireless addresses.

FIG. 5 is a simplified diagram of the wireless receiver 27 as coupled to other components of the mobile device 10. Generally, information sent by the wireless transport 14 is detected by a RF receiver 60 through the antenna 31. The RF receiver 60 provides the wireless information to a processor 62. The processor 62 temporarily stores the information in suitable memory, forming, for example, a FIFO (first-in-first-out) buffer. The processor 62 and memory 64 are operably coupled to an interface controller 66, which is commonly used to connect components to a computer system. In particular, the interface controller 66 couples the wireless receiver 27 to the bus 28 and to an interrupt controller 68 that is operably coupled to the processor 20 of the mobile device 10. The interface controller 66 is designed and operates according to known industry standards such as PCMCIA and Compact Flash Specifications. In one embodiment, the components of the wireless receiver 27 form a removable card that can be selectively coupled to an expansion slot provided in the mobile device 10 wherein suitable connectors are provided to couple the interface controller 66 to the bus 28 and the interrupt controller 68 as well as connect the wireless receiver 27 to the power supply 35 illustrated in FIG. 1. In the embodiment illustrated, the interrupt controller 68 is shown as being separate from the processor 20. In other embodiments, the interrupt controller 68 can be designed as part of the processor 20. The components of the wireless receiver 27 can be manufactured using known fabrication techniques as implemented in pagers, GSM phones, cellular phones or the like. Although illustrated and discussed below with respect to the processor 62, it should be understood that discrete components can also be used in place of the processor 62.

Operation of the wireless receiver 27 and the mobile device 10 is directed to efficiently use power from the power supply 35 in order to maximize the operational time between recharging or replacement of the battery 37. In one preferred embodiment, the wireless receiver 27 is powered and capable of receiving information from the wireless transport 14 at all times irrespective of whether other components of the mobile device 10 are operational and receiving power. This allows the wireless transport 14 to send information to the mobile device 10 even if the user is not interacting with the I/O components 24 of the mobile device 10.

When it is desired that the mobile device 10 receive information at all times, power from the power supply 35 is principally provided to the interrupt controller 68 and the wireless receiver 27, while all other components of the mobile device 10 do not receive power, or receive only enough power to operate in a "suspend" mode or state. For instance, the processor 20 can have three different modes of operation designed to maximize battery life by minimizing power consumption: full speed, standby and suspend. Full speed mode is used to execute applications. Standby mode is used during brief idle periods. Standby mode can use less than one-tenth (⅒th) of full speed power. Suspend mode is used during long idle periods. Suspend mode can use less than one-one thousandth (¹⁄₁₀₀₀th) of full speed power.

Figure 6:
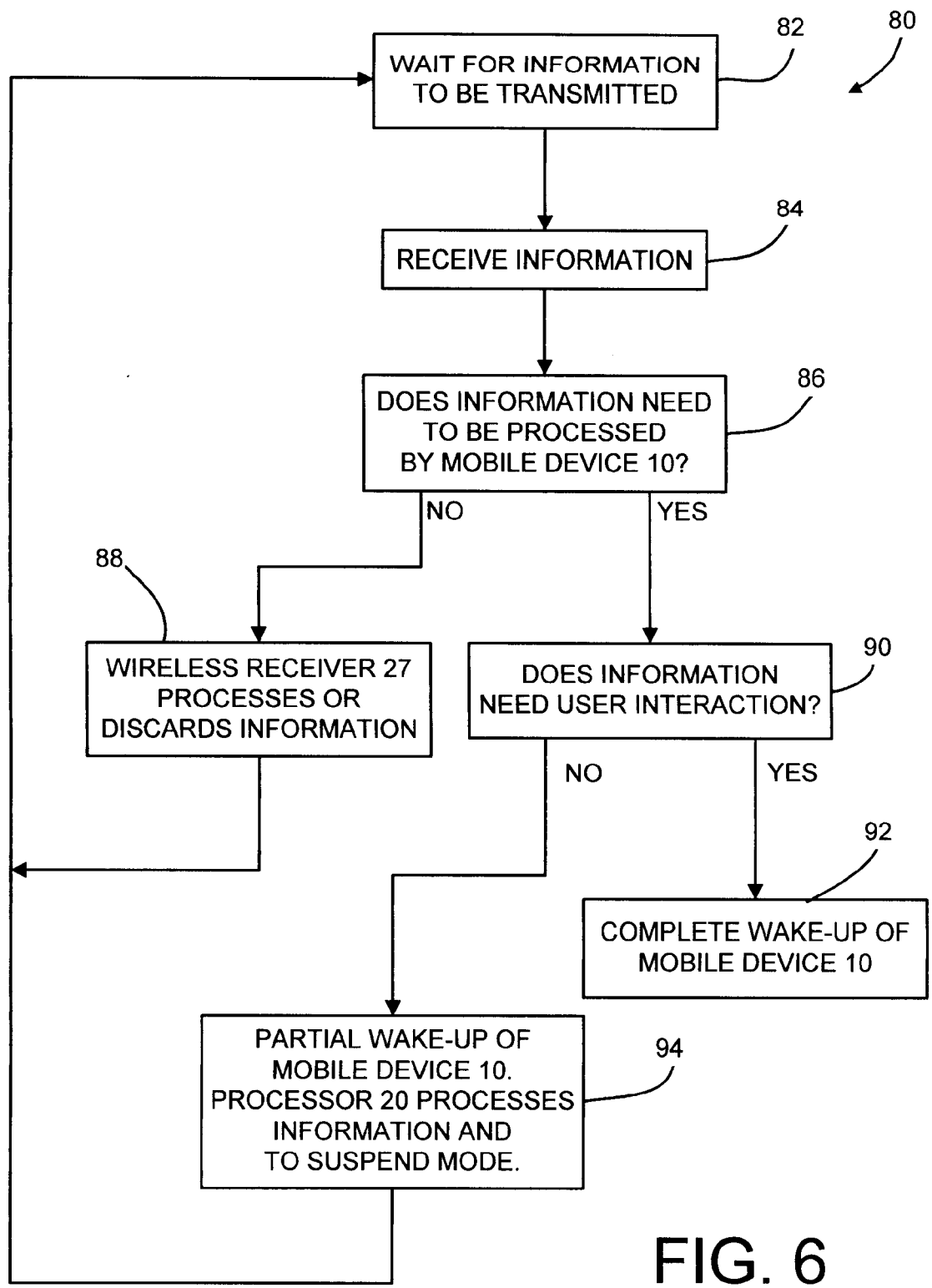
FIG. 6 is a flow chart illustrating a method of operation for the wireless receiver and the mobile device.

FIG. 6 illustrates a method of operation 80 of the mobile device 10 and the wireless receiver 27 to process information from the wireless receiver 27. At step 82, the wireless receiver 27 and the mobile device 10 await information to be sent from the wireless transport 14. It is assumed that only the wireless receiver 27 and the interrupt controller 68 are receiving power and operating, while all other components are either off or are in a suspend state, as discussed above.

At step 84, information is received by the RF receiver 60 from the wireless transport 14. The information is then processed by the wireless receiver 27 at step 86. In the embodiment illustrated, the processor 62 initially analyzes the information received and determines if the information requires further processing by the processor 20 of the mobile device 10 and/or storage of the information in the object store 18. If at step 86, the processor 62 determines that the processing or storage components of the mobile device 10 are not needed, operational flow continues to step 88 whereat the wireless receiver 27 processes or discards the information received. For instance, upon processing, the processor 62 can determine that the information received does not pertain to the mobile device 10, such as when a wireless address (capcode) does not pertain to the mobile device 10, and thus, the information can be discarded. Alternatively, the processor 62 can determine that all of the information can be temporarily stored in memory 64 for later retrieval by the processor 20 of the mobile device 10. After processing the information at step 88, operational flow returns to step 82 where the wireless receiver 27 awaits further transmitted information.

Steps 86 and 88 illustrate how the wireless receiver 27 can receive and process information without further interaction with other components of the mobile device 10. Thus, power consumption from the power supply 35 is conserved since none of the other components of the mobile device 10 have been turned on or operated at a higher power consumption rate.

If at step 86, the wireless receiver 27 determines that the information received must be further processed by the mobile device 10, operational flow continues to step 90. At step 90, the processor 20 is awoken by the interrupt controller 68 as initiated by the processor 62. The processor 20 retrieves the information stored in memory 64 and processes it to determine if user interaction is required. If user interaction is required, operational flow proceeds to step 92 whereat user input devices such as the keyboard 32 are activated and the user is notified of the information through the display 34.

If at step 90, the processor 20 determines that user interaction is not necessary to process the information, the processor 20 processes the information, turning on only those components of the mobile device 10 that are necessary at step 94. For instance, the information received by the wireless receiver 27 could have exceeded the memory capabilities of memory 64 and that the only required action is to store the information in the object store 18 or other temporary memory provided in the mobile device 10. In such a case, it is not necessary to activate or turn on the keyboard 32 or the display 34. The processor 20 merely performs the required actions such as storing the information in memory in the mobile device 10 and returns to the suspend mode. Operational flow then returns to step 82 whereat the wireless receiver awaits further transmitted information.

Steps 90 and 94 thus illustrate how power consumption is conserved since only a partial wake-up of the mobile device 10 has been performed to process the information. In other words, since only those components necessary to process the information have been turned on, while other components such as the display 34 remain off, power has been conserved and battery life has been extended.

At this point, it should also be noted that power can also be conserved by monitoring the source of system wake-ups and powering down the system as a function of the source. In particular, if the system is started in order to process an incoming message from the radio receiver 27, the system can be immediately shutdown upon the completion of processing. In contrast, when the system is started by the user using the power button 40, or when the system starts to provide the user a scheduled notification, such as an upcoming appointment, commonly the system will shutdown when a period of non-use has occurred. Rather than waiting for the non-use period to lapse for processing an incoming message, the system will shutdown immediately. However, if the system comes up because of the radio receiver 27 and then the user turns on the system, the system is allowed to remain up and shutdown if the non-use period lapses. The source of system start can be monitored by the interrupt controller 68.

Figure 7:
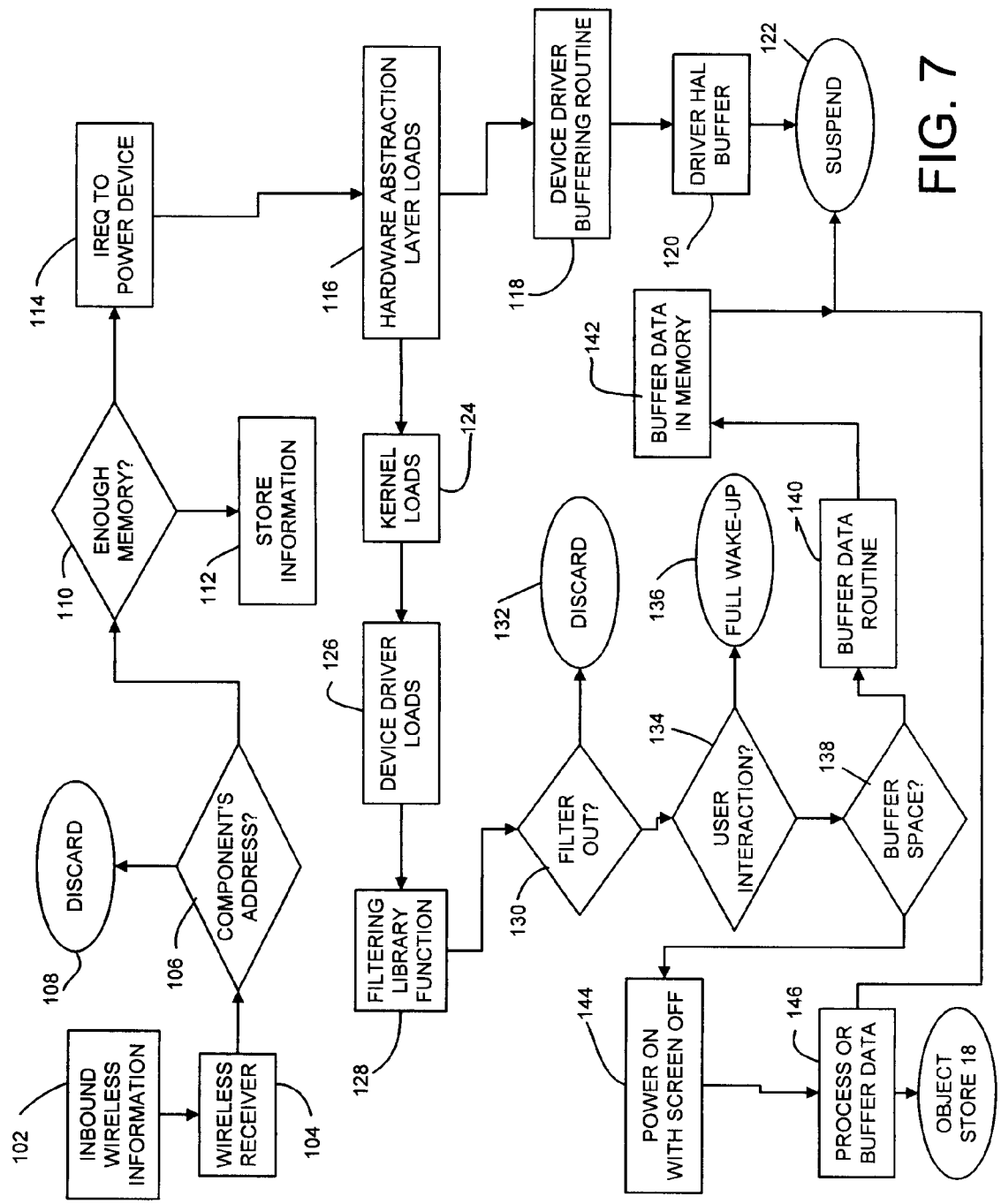
FIG. 7 illustrates a detailed flow chart illustrating operation of the wireless receiver and the mobile device.

FIG. 7 illustrates a detailed method of operation of the wireless receiver 27 and the mobile device 10. Generally, the wireless receiver 27 and the mobile device 10 process three types of incoming messages. A first type of message is not related to the mobile device 10 and is discarded. A second type of message is for the mobile device 10, but either can be received now for further processing at a later time, or can be received and processed at a later time. A third type of message is a high priority message that must be processed immediately and may require user interaction. All of these messages are efficiently handled by the method of FIG. 7 to conserve power and maximize battery life.

In FIG. 7, wireless data 102 is received by the wireless receiver 27 as indicated at step 104. At step 106, the wireless information is examined by the processor 62 to ascertain if the wireless address of the information pertains to the mobile device 10. Typically, the wireless receiver 27 will be configured to respond to multiple wireless addresses, wherein each wireless address is used by one or a number of services to send information to the mobile device 10. For instance, one wireless address can be used to send high priority or personal messages to the mobile device 10, while other wireless addresses are used by one or more services to send other information to the mobile device 10. At step 106, the processor 62 ascertains if the wireless information pertains to a valid wireless address of the mobile device 10. If the wireless information does not pertain to the mobile device 10, it is discarded at step 108.

At step 110, valid information for the mobile device 10 is stored in memory 64 of the wireless receiver 27. At this step, the processor 62 ascertains whether all of the information can be stored in memory 64, or if the mobile device 10 must be at least partially woke up. If the entire incoming information can be stored in memory 64, and the information is not high priority, the processor 62 stores the incoming information at step 112. If, on the other hand, the processor 62 determines that the incoming information cannot be completely stored in memory 64, or that the incoming information pertains to a high priority message, for example, based on its wireless address, an interrupt request is generated at step 114 to wake up the processor 20 of the mobile device 10.

At this point, it should be noted that the size of memory 64 is proportional to the rate at which wireless information is received by the wireless receiver 27 and the amount of time necessary for the processor 20 of the mobile device 10 to wake up and begin extracting information from memory 64. In one embodiment, the minimum amount of memory is provided in the wireless receiver 27 to store information until the processor 20 wakes up. In this manner, the size of memory 64 present in the wireless receiver 27 is less, thereby reducing the overall size of the wireless receiver 27 and reducing its cost.

At step 116, the processor 20 of the mobile device 10 executes an initial body of code herein called the hardware abstraction layer (HAL). As part of the HAL wake-up code, HAL can call a function herein identified as CheckAndProcessRadioWakeup( ). Generally, this function checks if the radio receiver 27 needs some service and whether this service can be handled within HAL or if more components of the device will need to be started. The return values include: (1) a first value indicating that the radio receiver 27 has been serviced and there is no need to start other components (herein the first value is "HRADIO_NOCONTINUE"); (2) a second value indicating that the display 34 should be turned on (herein the second value is "HRADIO_CONTINUE_VIDEO_ON"); and (3) a third value indicating that the display 34 should not be turned on (herein the third value is "HRADIO_CONTINUE_VIDEO_OFF"). It should be noted that the return values can be ignored if other wake-up events occur. For instance, if the user presses the power button 40 about the same time as a radio interrupt is also received, and if the return value is "HRADIO_NOCONTINUE" or "HRADIO_CONTINUE_VIDEO_OFF" the return value is ignored. In one embodiment, the radio receiver 27 registers information in a data block accessible by the HAL program indicative of the return values. The function is further described in detail below along with other functions and related information.

Based on the return values, the processor 20 retrieves the information stored in memory 64 and examines it to determine if the processor can store the information temporarily in a temporary buffer herein called the HAL buffer 120. If temporary storage in the HAL buffer 120 is possible, program flow continues to step 118 whereat the processor 20 executes a device driver buffering routine which stores the information in the HAL buffer 120. The processor 20 then returns to the suspend state as indicated at step 122.

If, on the other hand, at step 116, the processor 20 determines that the information cannot be stored in the HAL buffer 120, for instance, where the information is high priority or of length exceeding the storage available in the HAL buffer 120, the processor 20 continues its wake-up process and a kernel is loaded at step 124. Each of the device drivers, such as a display driver, a serial port driver, etc., is then loaded at step 126. One particular driver that is loaded is a pager driver, which executes a filtering library function is indicated at step 128. The pager driver examines the information at step 130 to determine if the information is relevant to the mobile device 10. In contrast to step 106 where information is discarded if it does not correspond to a wireless address recognized by the mobile device 10, information is discarded at step 130 if, based on its content, it is not relevant to the mobile device 10. For instance, the user may want to receive only football scores and no other sports scores. However, all of the sports scores may be transmitted with respect to a particular wireless address, thus information on baseball scores would not be discarded at step 106 since this information was transmitted with respect to the correct wireless address for football scores. However, at step 130, the content of the information is examined so baseball scores would be discarded, while football scores are retained. Steps 116 to 128 are very efficient and quick. In particular, the filtering step 128 examines the initial few bytes of the information and can quickly determine if the information should be kept or discarded. The number and location of the bytes to examine are predetermined and agreed upon between the wireless information carrier and software developers. By examining only the first few bytes, the filtering step 128 can execute quickly (the processor 20 is up for less time) and does not require all of the operating system services to be started. Non-relevant information is discarded at step 132. It should be noted that upon loading of the pager driver at step 128, any information stored in the HAL buffer 120 at step 120 from prior messages is retrieved and processed.

It should be noted that in a further embodiment, the filtering step 128 can include other filtering parameters can be set by applications executable on the mobile device 10. In other words, besides filtering on designated bytes within the message, as discussed above, the filtering library function can include other filtering parameters determined by application programs. For instance, a news viewer application can set a filter parameter where the mobile device 10 always rejects and does not store digital pictures and accepts only the accompanying text. The filter parameters can be passed from the application to the filtering library at filtering step 128 using, for example, application program interfaces (APIs). Filtering based on content is described below.

If the information is relevant to the mobile device 10 and should not be discarded, program flow continues to step 134 to determine if user interaction is needed. For instance, if the message pertains to a high priority message requiring acknowledgement by the user, the mobile device 10 completely wakes up with activation of the display 34 to indicate that a message of high priority has been received. A full wake-up is indicated at step 136.

In one embodiment, high priority messages are ascertained as a function of wireless addresses. FIG. 8 is a pictorial representation of a list of wireless addresses 150. Associated with the radio addresses is information as to which addresses are "high priority". In the embodiment illustrated, priority status entries 151 are provided and can be set when an address is for high priority. Any information or message that arrives on an address whose priority status entry 151 has been set will cause a full wake-up of the mobile device 10.

If the information does not require user interaction, program flow continues to step 138. At step 138, if buffer space exists and no further processing is necessary, the processor 20 executes a buffer data routine at step 140 to store the information at step 142. The processor 20 then returns to the suspend state at step 122. If buffer space does not exist at step 138, the mobile device 10 is powered-up without the display 34 at step 144. The information is then processed or additional buffer space is obtained at step 46. If necessary, access and storage can be made in the object store 18. The processor 20 then returns to the suspend state at step 122. It should be noted that considerable power has been conserved since the user input/output (I/O) devices (display 34 and keyboard 32) have not been powered. However, if the user were to activate the mobile device 10 to turn it on, the display 34 would immediately enable.

The mobile device 10 processes incoming wireless messages according to the above-described method in the background whether or not the user is actively interacting with the mobile device 10 using the I/O components 24. It should be noted that if the user were to turn off the mobile device 10, the wireless receiver 27 will remain powered to receive incoming messages. If the user were to turn off the power during processing of an incoming message, the display 34 would turn off to indicate at least partial shut down of the mobile device 10; however, the incoming message would be processed according to the above-described procedure. In this manner, the "power off" signal is trapped and processed when processing of the incoming message is complete (unless the processing of the message results in the need to perform a full wake-up).

Another aspect of the present invention allows for selective enabling and disabling of wireless addresses recognized by the wireless receiver 27. Referring back to step 106 in FIG. 7, the processor 62 (FIG. 5) examines the wireless address of information received and discards information at step 108 that does not pertain to a wireless address associated with the mobile device 10. One aspect of the present invention includes maintaining a list of recognized wireless addresses, for example, in memory 64, that the processor 62 can access when information is received. As stated above, FIG. 8 is a pictorial representation of a list 150 of wireless addresses. Each wireless address in the list 150 includes an associated operational status entry 163 indicating whether the wireless address is enabled or disabled. In a preferred embodiment, the list of wireless addresses is static in that the wireless addresses can not be changed by the user. However, whether the wireless address is enabled or disabled is under the control of the user and/or programming provided in the mobile device 10. Referring back to FIG. 5, the processor 20 of the mobile device 10 can selectively enable or disable each wireless address in the list 150 in memory 64 via the bus 28 and the interface controller 66.

Selective enabling and disabling of wireless addresses allows the mobile device 10 to further extend battery life by not receiving information that is not of high priority. For instance, the user may subscribe to an information service that provides general sports information that is transmitted with respect to a certain wireless address. This information may be repeatedly transmitted over a given time period such as a number of hours. If the wireless receiver 27 were to continually process the information each time it is transmitted, possibly waking up the mobile device 10 to process the information, the battery 37 (FIG. 1) can be quickly depleted. By selectively enabling or disabling the wireless address in the list 150 pertaining to this information, the wireless receiver 27 can quickly discard the information at step 106 (FIG. 7) in order to conserve battery power. For instance, the processor 20 of the mobile device 10 can enable the wireless address pertaining to sports information in list 150 when the mobile device 10 is receiving power from the external power source 41 (FIG. 1). If the mobile device 10 is operating under battery power, the processor 20 can disable the wireless address pertaining to the sports information in order to extend battery life.

Figure 9:
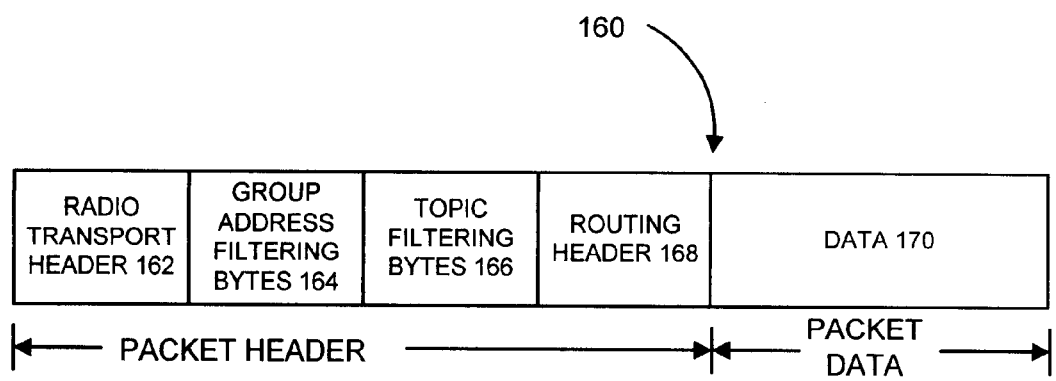
FIG. 9 illustrates a general structure of a message packet transmitted to the mobile device in accordance with one aspect of the present invention.

FIG. 9 illustrates one embodiment of an information packet 160 of web content data received by wireless receiver 27. Wireless receiver 7 can receive messages of substantially any format. Many different types of header formats can be defined for receipt by the wireless receiver 27. FIG. 9 gives but one illustrative type of packet formula.

Information packet 160 preferably includes a plurality of portions, such as radio transport header 162, group address bytes 164, topic filtering bytes 166, routing header 168 and data 170. The radio transport header 162 includes wireless address (capcode) information. As discussed above, the wireless address information is an identifier used to send a radio message to RF receiver 60 (or any other similar type of radio card) illustrated in FIG. 5. The radio transport header 162, in one embodiment, supports sixteen different addresses. RF receiver 60 filters and discards any radio messages which do not match any of the wireless addresses. If a match is observed, then RF receiver 60 has detected a radio message potentially addressed to it, and must receive and further process the message.

Group addresses bytes 164 and topic filtering bytes 166 are also provided. A group address, as referred to herein, is a subclass of a wireless address that is used in accordance with the present invention to extend the filtering capability of an address. Further, a topic is a subclass of a wireless address or group address, which is also provided to extend the filtering capability of the wireless address and group address information.

IT should be noted that information packet 160 arriving at wireless receiver 27 with an appropriate address may not have group address bytes 164 and topic filtering bytes 166 pre-appended thereto. If those bytes are present, however, a driver 200 (FIG. 10) operates to filter the information packet 160 based on the group and topic filtering bytes.

The driver 200 implements logic which first examines information packet 169 to determine whether any group and topic filtering byets are included in information packet 160. In one embodiment, the driver 200 supports a library which includes a function AnalyzeMessage ( ). The AnalyzeMessage function isolates service group codes and other information in the incoming message. If group and topic filtering bytes are present, then the group and topic filtering functions must be performed.

In one embodiment, mobile device 10 includes a memory which contains a group table. Briefly, the group table contains entries of service groups, each of which can be associated with any suitable address. Also, there can preferably be any suitable. number of service groups associated with one address. Thus, in one embodiment, group entries in the group table are sorted by address numbers, then by service group codes.

If group or topic filtering bytes are detected, then the driver 200 searches the group table to determine whether the service group code detected in information packet 160 is listed in the group table, and whether it is active or inactive. If the service group code is not found in the table, or if it is found but it has been deactivated (or disabled), then the driver 200 discards the information packet 160 and no further processing is done with respect to that message. However, if driver 200 determines that the group address bytes 164 are included in the group table, then it is determined that the message was intended for that particular mobile device 10 and further processing continues on topic filtering bytes 166, if present. Topic filtering is discussed in greater detail below.

Since all of the group and topic filtering is done at the level of driver 200, it occurs quite low in the protocol stack, or system architecture, of mobile device 10. Thus, filtering occurs early on in the process and the storage space required for the address and message is quite low. In addition, since the driver 200, itself, performs much of this filtering, the group and topic filtering bytes allow any application running on mobile device 10 to pass correct filtering information down to the group and topic tables for filtering at the level of driver 200. This significantly improves power consumption over previous designs because the messages do not need to be received, processed, and passed all the way up to the application level in the protocol stack, or architecture, of mobile device 10 before being filtered.

Figure 10:
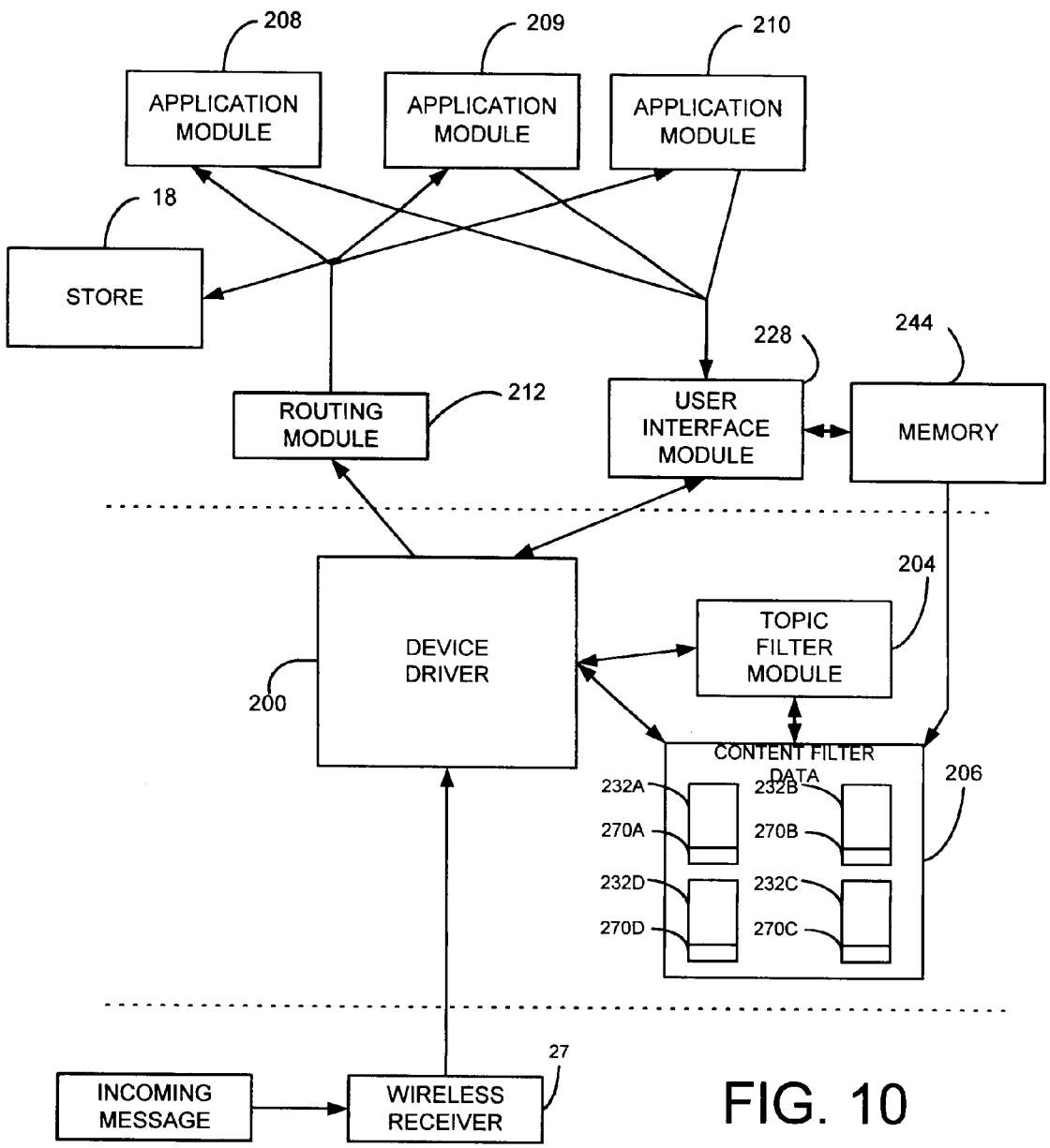
FIG. 10 is a block diagram illustrating modules of a mobile device for filtering based on content.

FIG. 10 illustrates hardware and software modules for filtering input messages based on topic filter bytes 166 prior to storage or delivery to a higher level application module. Generally, in the exemplary embodiment, the modules include the driver 200 that receives messages of the exemplary format described above from the wireless receiver 27. If the input message includes topic filter bytes 166, driver 200 executes a topic filter module 204 that compares the topic filter bytes 166 with previously stored content filter data 206. If the topic filter bytes 166 correspond to user preferences as indicated by the content filter data 206, driver 200 passes the information upwardly in the mobile device architecture for storage in store 18 and/or use by higher level application modules indicated at 208, 209 and 210. In the embodiment illustrated, a routing module 212 is provided to receive at least the data 170 from the driver 200. Routing module 212 forwards the input message to store 18 or any of the application modules 208–210 as required or given by routing header 168 (FIG. 9). Communication between driver 200 and routing module 212 can be implemented using standard APIs.

Figure 11:
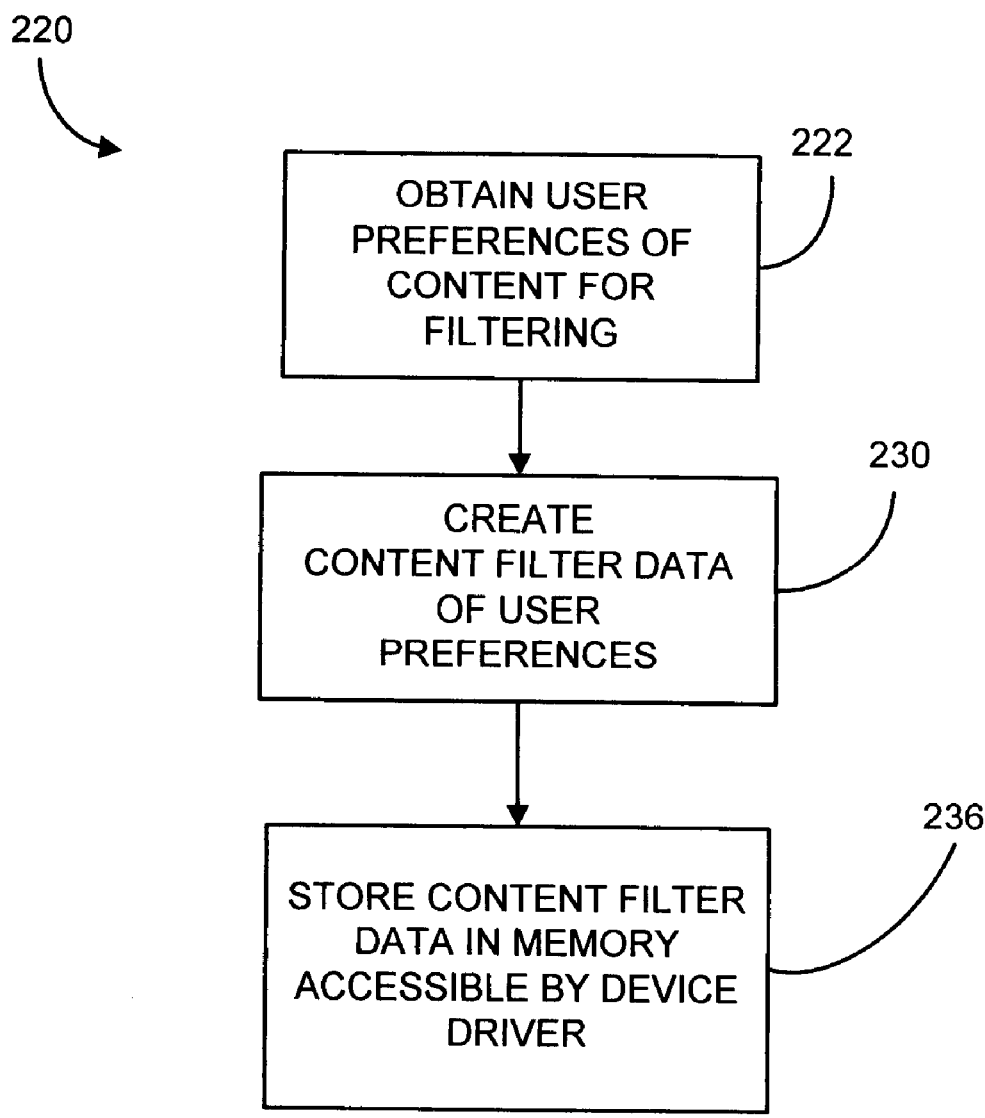
FIG. 11 is a flow chart illustrating a method of obtaining and creating content filter data.

FIG. 11 illustrates a method 220 for obtaining and creating content filter data 206 used to filter input messages or information packets 160. At step 222, user preferences are obtained for the content that will be filtered. Generally, the user provides individual indicators, a range of indicators or a set of indicators that the user would or would not like to receive information on. For example, the indicators can comprise key words, characters, numbers, etc., that have typically been previously agreed to with the information source provider 13 to be used for filtering content. If desired, a hashing function can be used for all packets received, or can be selected based on the type of content information which will be received. For instance, a first hashing function can be used for ASCII strings while other hashing functions can be used for numeric data, non-ASCIIU unicode data, binary data, etc. In another application, indicators in the topic filter bytes 166 can be zip code data allowing region-specific filtering to be received. In yet another application, the topic filter bytes can be mnemonic codes for "channels" of broadcast information, allowing the user to subscribe or unsubscribe to specific channels. Referring back to FIG. 10, a user interface module 228 obtains the indicators from the user. The user interface module 228 can be accessed by or incorporated into application modules 208–210.

Having obtained the user preferences for content filtering at step 222, content filter data 206 is created at step 230. In one embodiment, content filter data 206 is organized as a function of wireless addresses or group addresses in order that content filtering can be performed as a function of the wireless address or group address of the incoming message. In the embodiment illustrated, a plurality of filter data tables 232A, 232B, 232C and 232D are shown, wherein each filter data table 232A–232D is associated with a wireless address or a group address. In one embodiment, the filter data tables 232A-232D can simply contain the indicators provided the user. However, in order to conserve memory resources, it may be advantageous to transform the indicator into another, smaller representation. For example, a translation function can be implemented wherein a unique integer (within a small range) is obtained for each indicator. The unique integer can then be stored in the corresponding filter data tables 232A–232D. In a further embodiment, each of the filter data tables 232a–232D can comprise a bit-array where the unique integer is used as an offset into the array and wherein each bit, if set ("1"), indicates that the corresponding content is desired, and wherein if the bit is reset ("0"), the corresponding content is not desired. In yet a further embodiment, a hashing function can be used if the range of unique integer numbers becomes too large. However, since the integers will no longer be unique, undesired content information may be obtained if the topic filter bytes 166 in the incoming message correspond to an integer of desired content information.

At the step 236, content filter data 206 is stored in memory accessible to driver 200. In one embodiment, content filter data 206, or a smaller portion such as one or more filter data tables 232A–232D is created in memory 244 accesible by user interface module 228, and then transferred to memory accessible to driver 200 in its entirety, for example, though driver 200. Alternatively, driver 200 can allocate necessary memory wherein content filter data 206 or portions thereof, such as filter data tables 232A–232D, are incrementally updated or populated according to the user preferences.

Figure 12:
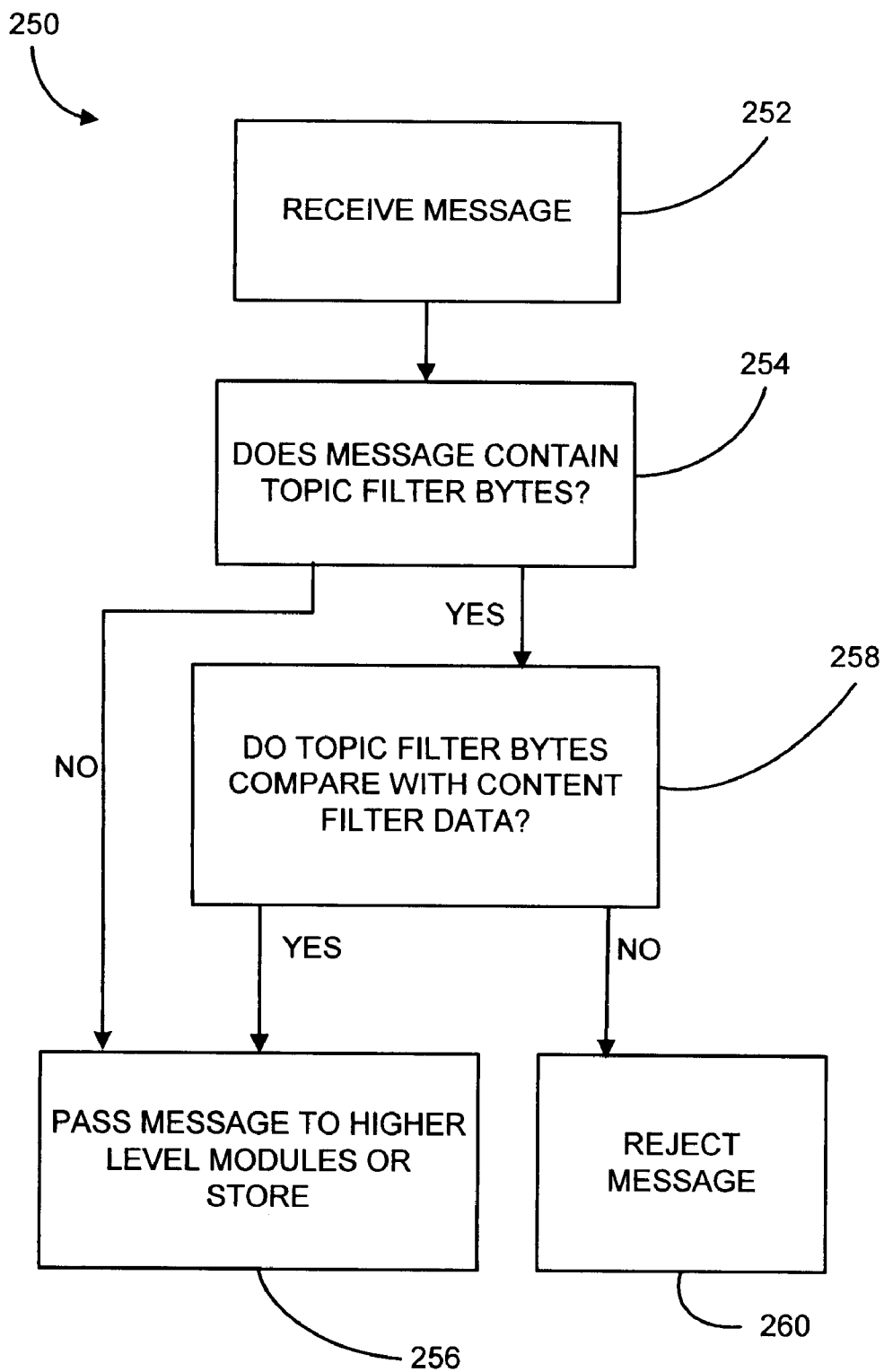
FIG. 12 is a flow chart illustrating a method of filtering a message using content filter data.

FIG. 12 illustrates a method 250 for processing an incoming message that has been transmitted on a wireless address or group address recognized by mobile device 10. At step 252, driver 200 receives the incoming message. At step 254, driver 200 analyzes the message using the AnalyzeMessage ( ) function described above to ascertain if the incoming message includes topic filter bytes 166 for content filtering. If the message does not contain topic filter bytes 166, operational flow proceeds to step 256 whereat the driver 200 passes the incoming message to store 18, higher application modules 208–210 or, in the embodiment illustrated, to routing module 212.

If, however, the incoming message includes topic filter bytes as detected at step 254, operational flow continues to step 258 whereat driver 200 provides the topic filter bytes 166 to topic filter module 204. Topic filter module 204 compares the topic filter bytes 166 with content filter data 206. In the embodiment illustrated, topic filter module 204 accesses the filter data table 232A–232D that corresponds to the wireless address or group address upon which the incoming message was transmitted. If filter data tables 232A–232D have been created using a hashing function, topic filter module 204 operates the hashing function upon the topic filter bytes 166 so as to ascertain if the incoming message pertains to desired content. It should be noted that the topic filter bytes 166 can be in a compressed and/or in a protocol format such as UNICODE in order to transmit the data packet 160 over a wireless network. In such cases, topic filter module 204 operates upon the topic filter bytes 166 as necessary in order to make a comparison with content filter data 206. It should also be noted that the same hashing function need not be used for each filter data table 232A–232D. Rather, different hashing functions can be used for one or more of filter data tables 232A–232D. Topic filter module 204 can maintain a table of hashing functions according to wireless addresses or group addresses and access this table based on the wireless address or group address that the message was transmitted on.

Topic filter module 204 provides as an output an indication of whether or not the incoming message relates to the user's preferences. If the incoming message pertains to desired content information as compared to content filter data 206, operational flow continues to step 256 whereat driver 200 forward at least the data portion of the message further in the architecture of the mobile device 10 as discussed above. Otherwise, operational flow proceeds to step 260 whereat the message is discarded by driver 200. Although illustrated wherein functions of driver 200 and topic filter module 204 have been separated, it should be understood that these functions can be performed by driver 200 alone, or divided up among even more than the two modules illustrated in the exemplary embodiment.

In one embodiment, APIs are provided to allow application modules 208–210 to operate with driver 200 in order to select operational parameters and/or access content filter data 206. Exemplary APIs include:

IsGroupTagRegistered (LPWSTR sxGroupTag, BOOL *fResult, LPDWORD pdwDevice) This API allows an application module to query driver 200 to ascertain if content filtering will be performed on an address or a group address. As discussed above, driver 200 can maintain a table or other list indicating enablement or disenablement of content filtering as a function of address or group address irrespective of the existence of a filter data table corresponding to the address or group address. This allows easy enabling or disenabling of content filtering as a function of an address or group address. This API returns a "true" or a "false" indication in "fResult" as to whether the group address as given by "szGroupTag" is registered or not.

CreateFilterTable (HANDLE *phFTable, DWORD dwNumEntries, WIS_FILTER_TABLE wftFilterType)

This API allows an application module to create a filter data table wherein the approximate size or entries of the table is provided at "dwNumEntries". Driver 200 or user interface module 228 allocates necessary space in memory for content filter data 206, or memory 244, respectively, and provides back to the application module a handle or a pointer at "phFTable". It should be noted that the filter data table can be create first in memory 244 and then transferred to memory accessible by driver 200.

In the embodiment illustrated, this API also can include an input denoted herein as "wftFilterType", which can be used to select predefined filter functions. For instance, a first value can be provided to indicate that all messages transmitted on the wireless address or group address or group address will be accepted. A second value can be provided to indicate that all messages will be rejected. A third value can be provided to indicate that a preselected filtering function, such as hashing function will be used. (Other filtering functions can include an individual, set or range of content information.) A fourth value can be provided to indicate that a particular type of data needs to be received first before content filtering will begin. The latter is probably best illustrated by an example. In co-pending application entitled "CHANNEL DEFINITION ARCHITECTURE EXTENSION", a system and method are described wherein Web or Internet is rendered on a mobile device using a channel definition format (CDF) file, a set of script files and a set of data files. Briefly, navigation of the content on the mobile device is performed using the CDF file which includes references to the script files and the data files. When one particular page of content is to be displayed, a script file is accessed and is used to operate upon the data file in order to render the desired information. This architecture allows wireless updates of data files, because, typically, only the data files will change with time. However, if desired, the CDF files and the script files can be also be updated wirelessly. Each of the data files, script files and CDF files have associated identifiers.

In such a system, content filtering can be provided as a function of particular data to be displayed. For instance, the user may only want information regarding football or baseball articles (which are associated with certain identifiers), but not want any articles related to hockey (which are associated with another identifier). Using topic filter bytes 166 as described above, the user can filter the data files accordingly using the identifiers. However, in this system, as discussed above, in order to display the data files, it is necessary that the user receive the CDF file so that upon rendering, the application module will know which script file to use to render the data. The fourth value can be used to indicate that the CDF file must be received before any content filtering will be performed. Upon receipt of the CDF file, this API can then be used to initiate content filtering by providing, for example, the third value.

SetHashValue (Handle hFTable, LPWSTR szValue)

This API is used in accordance with a filter data table comprising a bit-array that is set according to a hashing function. In particular, the hashing function is applied to the input given by "szValue" wherein the filter data table indicated by a handle or a pointer "hFTable" is updated to reflect the desired content.

SetPreference (HANDLE hFTable, DWORD dwPreferences)

This API allows additional information to be stored for each of the filter data tables 232A–232D. Referring back to FIG. 10, the additional information is indicated at 270A, 270B, 270C and 270D, respectively, for each of the filter data tables 232A–232D. In one embodiment, the additional information 270A–270D can store global preferences that will be applied to the incoming message if transmitted pursuant to the wireless address or group address. For example, data filter table 232A can correspond to football and baseball articles provided on a selected "channel". If desired, an application module can also store a value in portion 270A indicating that only text information will be provided from driver 200 whereas, for example, data pertaining to images will be discarded. In the embodiment illustrated, topic filter module 204 accesses additional information 270A–270D when the corresponding filter data tables 232A–232D are accessed. This information is provided to the driver 200 where the message is further filtered by additional information 270A–270D. In an alternative embodiment, all filtering functions can be performed by topic filter module 204 whereby driver 200 receives only that portion of the message that will be forwarded to higher level modules of the mobile device 10.

RegisterFilterTable (HANDLE hFTable, LPWSTR szGroupTag, LPDWORD pdwDevice)

This API associates a data filter table with a selected address or group address. As discussed above, in one embodiment, the filter data table can be created in higher level memory 244 associated with application modules 208–210. This API will copy the created data filter table (and associated additional information, if present) into memory accessible by driver 200. It should be noted that this API also allows an application program to disassociate a data filter table from a wireless address or a group address. In the embodiment illustrated, a "null" value for "hFTable" will cause driver 200 to disassociate the filter data table in memory accessible by it for the address or the group address given by "szGroupTable".

DestroyFilterTable (HANDLE hFTable)

This API releases the high level memory 244 accessible by the application program module to create the filter data table. It should be noted that this API does not disassociate the data filter table from the address or group address at the level of driver 200.

The following provides exemplary architecture and application program interfaces (API) for a Windows CE® mobile device.

1.1.1 Overview

Wireless Services for Windows CE® defines a hardware, device drivers, and overall architecture for the incorporation of message-based radio into a Windows CE® device. The goal is to create a framework within which applications, system services and hardware all remain modular with respect to each other, thus providing the environment for a wide range of applications.

This appendix addresses what support the device drivers need to provide to meet the following requirements:

1. Power saving achieved by not waking up the whole system.
2. Doing background processing without turning on video 1.1.2 Terminology

| | |
|---|---|
| Device | Windows CE ® hardware (e.g. Palm PC, Auto PC) |
| Radio | Radio HW for a device (e.g. a paging card) |
| OEM | Original Equipment Manufacturer - In this document this term refers to the device manufacturers |
| IHV | Independent HW Vendor - In this document IHV refers to the radio manufacturer (who develops the HW and/or device driver) |
| HAL | Hardware Abstraction Layer. This is implemented by each OEM to abstract their HW implementations from the Windows CE ® operating system. |
| LCD and VIDEO | These two terms have been used interchangeably and refer to the display panel on the device. |

1.1.3 Overview

A typical radio device listens to the radio transmissions and determines if there is a message for the user. This determination is based on one or more 'addresses' that are programmed in the radio receiver or hardware (HW). The radio HW is powered independently (i.e., it is powered even when the Windows CE® device is powered down) and the radio HW carries out the lowest level of filtering without requiring the Windows CE® device to be powered on. This achieves some level of power savings since radio HW typically require only a fraction of power compared to the Windows CE® device.

Wireless Information Services for Windows CE® provides for additional levels of filtering that may or may not be carried out in the radio HW. If the radio HW is separately powered and has enough logic to do additional filtering independent of the device CPU, then it will not cause major power drain from the device power supply. However, it is expected that the majority of the radio HW will be in the Compact Flash card type II form factor (a form factor for most devices) and will not have separate power or CPU due to size constraints. These cards, therefore, will cause a wakeup of the device so that some processing is carried out in the device driver.

Another way to achieve power saving is not to wakeup the system for each message but to buffer them for group processing at a later time. The radio HW may not have enough memory and to use the Windows CE® device memory for this purpose will ordinarily require the device to be woken up to run the device driver code that copies message from the radio HW to the system memory. In this case we want the system to be up for a very short duration and there is no need for the display and other subsystems to be powered on.

Thus, the power saving goals can be summarized as:

System comes up quickly and stays powered on for as little time as possible

The LCD is not turned on until it is needed

System shuts down as soon as possible (currently, once the system is up, it does a time out of the order of 1–5 minutes to shutdown)

To achieve the above goals, Win CE Radio device drivers support a state called Partial Wakeup state. This refers to the device state just after wakeup where HAL has initialized but the kernel and file system are not fully initialized. The objective is to do some processing in this state to filter out unwanted messages and shut down the system as soon as possible, ideally from the partial wakeup state itself.

1.1.4 Driver Support for Partial Wakeup

This section describes what support needs to be provided in the driver.

1.1.4.1 RIO_Init( )

During system initialization, radio driver initialization function RIO_Init( ) is called. In addition to the other initialization, it should call a MS supplied function called 1.1.6.1 RegisterWakeup( ) and supply the address of a call back function as parameter. The call back function (called CheckAndProcessRadioWakeup( ) in this document) is described below.

See section 0 for sample code for RIO_init( ) function.

Section 0 describes RegisterWakeup( ) function that does the following:
1. Calls VirtualAlloc( ) to allocate needed memory space. This space will be used to store pointers to buffers for radio and other data (e.g. data for filtering functions). This memory is referred to as Radio Control Block.
2. Makes the kernel call to lock the driver code and allocated buffers in memory.
3. Calls HAL IOCTL calls and registers a function in driver space that will be called by HAL during warm boot when the wakeup source is radio (this function, called CheckAndProcessRadioWakeup( ) in this document, determines if the wakeup should continue or not). HAL maintains a data structure for each device driver to store this function pointer.

1.1.4.2 Registered wakeup callback function

The radio driver is expected to supply a function which will be called during the system wakeup sequence from HAL. This function executes in the partial wakeup state and therefore has many limitations and requirements (described later). The main purpose of this function is to achieve power savings for the device. Power saving is achieved in many ways as listed below:

The function could simply read the data off the radio HW and buffer it in the memory blocks for later processing. It could also implement low level filtering (e.g. group level filtering, if the radio HW is not capable of doing it). In this case the function returns a value indicating that system wakeup is not required (in this scenario this function acts like an interrupt service routine, quickly servicing the radio HW and shutting down the system as soon as possible)

If the system buffers are full, the function could return a value indicating to the HAL that a system wakeup is required but there is no need to power the display. In this scenario, the system will wakeup and execute message router and other components that process the messages and most likely will shut down the system after processing is complete.

If the data is high priority (e.g. a personal page), the function should return a value indicating to the HAL that a full system wakeup is required because this message will most likely cause a user notification.

1.1.5 Data Structures
1.1.5.1 Radio control block

The radio control block data structure is maintained by HAL. A pointer to the radio control block is passed to the registered function (called 1.1.7.1 CheckAndProcessRadioWakeup( ) in this document). The radio control block holds pointers to memory blocks that contain data or code. These memory blocks are allocated using VirtualAlloc( ) function, are locked down so that they are accessible during partial wakeup state, and are accessed using physical addresses.

The radio control block is an array of RADIO_BLOCK which is defined below:

```
typedef struct _hradio_block {
    DWORD dwId;      // Block ID
    DWORD PAddr;     // Physical address of block
    DWORD VAddr;     // Virtual address of block
```

```
    DWORD dwSize;    // Size of block
} HRADIO_BLOCK, *LPHRADIO_BLOCK;
```

The block can be either a pointer to code or a pointer to data as determined by the dwId field. The Ids are generated using macros defined in the next section.

1.1.5.2 Block ID Macros

The radio control block stores pointers to code or data that needs to be accessed during partial wakeup state. The entries are tagged using an id, which is generated using one of the macros defined below:

HRADIO_MAKE_DRIVER_ID (Par1, Par2)
 Generates an id for a driver function or data block. Par1 can be either HRADIO_DATA (for defining a data block pointer) or HRADIO_CODE (for defining a function pointer). Par2 is an unsigned 16-bit value.

HRADIO_MAKE _SYSTEM _ID (Par1, Par2, Par3)
 Generates an id for a known system function or data block. These ids are used internally by the system and should not be used by the device drivers. Par1 can be either HRADIO_DATA (for defining a data block pointer) or HRADIO_CODE (for defining a function pointer). Par2 and Par3 have the following meanings:

| Par2 | Par3 | |
|---|---|---|
| 0 | HRADIO_WAKEUP | Pointer to the partial wakeup call back function or data |
| 0 | HRADIO_ANALYZE_MSG | Pointer to the AnalyzeMessage( ) function or data |
| 0 | HRADIO_FILTER | Pointer to the FilterMessage( ) function or data |
| Address | Group | Pointer to application filter function or data for the given address/group combination |

1.1.6 Function Reference—MS Supplied Functions
1.1.6.1 RegisterWakeup( )
This function does the following:
Creates the Radio control block (VirtualAlloc( ), lock it, register with the HAL)
Makes HAL IOCTL call to register the wakeup callback function (which will be called by HAL during partial wakeup sequence)
Makes HAL IOCTL call to register AnalyzeMessage( ) function (which deciphers the message header)
Makes HAL IOCTL call to register FilterMessage( ) function (which invokes the application level filtering functions)
Syntax

```
LPHRADIO_BLOCK RegisterWakeup(
    BYTE DeviceId,
    BYTE NumBlocks,
    LPVOID pWakeupFn,
    DWORD dwWakeupFnSize)
```

Parameters
  DeviceId
    Identifies the device controlled by this driver (this parameter is derived from the parameter passed to the RIO_Init( ) function)
  NumBlocks
    Number of additional radio control block entries needed by the driver (driver will need one entry for each buffer or function it intends to use during partial wakeup state). This does not include system required entries, e.g. the partial wakeup callback function etc.
  pWakeupFn
    Pointer to the partial wakeup callback function.
  dwWakeupFnSize
    Size in bytes of the partial wakeup callback function. If not used, pass a 0 value.
ReturnValue
  Returns pointer to the radio control block if successful, NULL otherwise.

1.1.6.2 LocateAndCallAnalyzeMessage( )
This function locates and invokes the AnalyzeMessage( ) function in partial wakeup state (driver can call the AnalyzeMessage( ) function directly in other places).
Syntax

```
BOOL LocateAndCallAnalyzeMessage (
    VOID *pMsg
    DWORD dwMsgLen,
    BOOL *pfDiscard,
    BYTE *pGroupCode)
```

Parameters
  pMsg
    Pointer to the message bytes.
  dwMsgLen
    Length of the message.
  pfDiscard
    Receives a BOOL value indicating whether the message should be discarded or kept.
  pGroupCode
    Receives the Group code.
Return Value
Returns TRUE if message had a valid WS header, FALSE otherwise. When it returns TRUE, pGroupCode receives the group code and pfDiscard receives a BOOL value indicating whether the message should be kept or not (TRUE=discard).

1.1.6.3 LocateAndCallFilterMessage( )
This function locates and invokes the application level filtering mechanism.
Syntax

```
BOOL LocateAndCallFilterMessage (
    VOID *pMsg,
    DWORD dwMsgLen,
    BYTE Address,
    BYTE GroupCode)
```

Parameters
  pMsg
    Pointer to the message bytes.
  dwMsgLen
    Length of the message.
  Address
    Address number this message came on.
  GroupCode
    Group code this message came on.
Return Value
Returns TRUE if message should be kept, FALSE if it should be discarded.

1.1.6.4 RegisterBlock( )
Allocates a memory block, locks it down, and creates an entry in the radio control block for it. Then data from the supplied buffer is copied into this newly allocated memory block.
Syntax
  LPHRADIO_BLOCK RegisterBlock(BYTE DeviceId, DWORD dwBlockId, LPBYTE lpbData, DWORD dwDataLen)
Parameters

| Device Id | The block will be added to the radio control block for this device. |
|---|---|
| dwBlockId | Block Id to be assigned (This id must be output of macros defined in 0) |
| lpbData | Pointer to the data that will be copied in a newly allocated memory block. |
| dwDataLen | Length of the data (this is the size of the newly allocated memory block) |

ReturnValue
Null is returned if data block can't be created. pointer to the created radio block is returned otherwise.
Remarks
The dwBlockId also indicates whether the block is a code block (function) or data block (buffer).

1.1.6.5 LocateBlock( )
This function searches the radio control block for the given block id.
Syntax
  LPHRADIO_BLOCK LocateBlock (BYTE DeviceId, DWORD dwBlockId)
Parameters
  DeviceId
    The block will be searched in the radio control block for this device.
  dwBlockId
    Block Id to be assigned (This id must be output of macros defined in 0)
ReturnValue
Returns pointer to radio block if ID found, else returns NULL 1.1.6.6 Busy( )
This function increments or decrements the system busy counter.
Syntax
  WORD Busy(BYTE State)
Parameters
  State
    If TRUE, increments the busy counter. FALSE decrements busy counter.
ReturnValue
Returns current value of system busy counter.

1.1.6.6 Video( )
This function turns the video on or off.

Syntax
  BOOL Video(BYTE State)
Parameters
  State
    If TRUE, turns video on. FALSE turns video off.
ReturnValue
Returns TRUE if operation completed, FALSE otherwise.
1.1.7 Function Reference—IHV Supplied Functions
1.1.7.1 CheckAndProcessRadioWakeup( )
This function is statically part of the radio driver but is called by the HAL during warm boot. The main purpose of this function is to check if the radio device needs some service and whether this service can be handled within HAL or it requires the whole system to be woken up.
Syntax

```
DWORD CheckAndProcessRadioWakeup (
    DWORD MemPtr    Pointer to radio control block
)
```

Description
This function is called in response to the wakeup interrupt from the radio device (RING_INDICATE interrupt). This function is called by HAL before the kernel is initialized (partial wakeup state), Because of this, this function must meet the following criteria:
  The function must be on a page boundary.
  The function will be executed in physical mode
  The function must not call any OS or file system calls.
  The function must not call any other function. (If it needs to call other driver supplied functions, they must be called via a function pointer table initialized during startup. See Error! Reference source not found. and Error! Reference source not found. for details.)
The function should read the data from the radio device and determine if the data needs to be kept or discarded. If the data needs to be kept, it should further determine if it is high priority data (see device driver specifications for discussion of address and group property flags). High priority data needs to be processed immediately and will require a full wakeup. Low priority data may be buffered in memory allocated during startup. If that memory is full, a full wake up is again required to flush that memory. In either case, the data is read off the radio device and appropriate return value is passed to the HAL.
The skeleton of this function is:
  read data off the radio HW
  Call AnalyzeMessage( ) to get the group code information from the message header
  Do group level filtering (if the HW has not done it)
  Invoke application level filtering mechanism. Do message filtering based on the return code.
  if message is to be kept, then buffer it and return appropriate return code
Since this function is executed during the partial wakeup state, it can not make function calls directly. Instead a support library has the following two functions to invoke the AnalyzeMessage( ) and filter mechanism:
  LocateAndCallAnalyzeMessage( )—this function invokes the AnalyzeMessage( ) function described in the device driver specifications.
  LocateAndCallFilterMessage( )—this function invokes application level filtering (to be documented).

Return Values
HRADIO_NOCONTINUE
  The device has been serviced, no need to continue the warm boot. An example of this case would be when the radio device has a new message that can be buffered in the system memory (done by this function) and no further processing is required.
HRADIO_CONTINUE_VIDEO_ON
  The device service needs the system to continue the warm boot with video (the video should be powered on too). An example of this case would be when a message is received on a priority address that will cause a notification to be issued.
HRADIO_CONTINUE_VIDEO_OFF
  The device service needs the system to continue the warm boot without video (the video should not be powered on). An example of this case would be when a broadcast message is received when the system memory buffer is full, so processing should continue without video so the system buffer can be flushed.
Remarks
  The partial call back function is quite similar to the interrupt service function (ISR) (also supplied by the driver). However, there are some significant differences as outlined below:

| ISR | Partial wakeup call back function |
|---|---|
| Registered using CardRequestIRQ( ) Registered for a specified socket and function pair. | Registered using RegisterWakeup( ) Registered for a driver. |
| Interrupt condition cleared by Card Services. | Call back function needs to clear the interrupt condition. |
| Return as quickly as possible. If more processing needed, spawn a thread and return. | Return as quickly as possible, can not spawn a thread. |
| Kernel and file system services available. Always called to handle the interrupt from the radio HW. | No kernel or file system services. Called only if the interrupt causes a system wakeup (if the system is already up at the time of the interrupt, only the ISR gets to execute). |
| Responsible to copy the message from the radio HW, to analyze it, and to filter it. Can call the MS supplied functions directly to do these. Is a normal user-mode function. | Responsible to copy the message from the radio HW, to analyze it, and to filter it. Can call the MS supplied functions using special indirection methods only. Is a special function that executes in physical mode and has special restriction on it (e.g., must be on a page boundary, can not call other functions, etc.) |

1.1.8 Sample Code
1.1.8.1 RIO_Init( )

```
HINSTANCE HalLib;
LPHRADIO_BLOCK HalMem;
// Since the Register function needs to be located on
// a page boundary, the following pragma assures that.
DWORD CheckAndProcessRadioWakeup (DWORD);
#pragma alloc_text (".wakeup", CheckAndProcessRadioWakeup)
```

```
...
HalLib = LoadDriver (TEXT("riohal.dll"));
    if (HalLib) {
    func = GetProcAddress (pRadioCtl->HalLib,
            TEXT ("RegisterWakeup"));
    if (func) {
        // Call RegisterWakeup( )
      HalMem = (LPHRADIO_BLOCK)
            (*func) ((DWORD) CheckAndProcessRadioWakeup);
        }
    }
}
```

1.1.8.2 CheckAndProcessRadioWakeup( )

```
LPBYTE pAddressTag, pGroupTag;
BOOL fDiscard, fGroupFound;
BYTE GroupCode;
char *p, buf [1000];
BYTE bMsgBuf [MAX_MSG_SIZE];
WORD dwMsgSize;
char address = 1
// Fill szMsgBuf[ ] with message data from the Radio HW
...
// do group filterning
fGroupFound = LocateAndCallAnalyzeMessage (bMsgBuf,
    dwMsgsize,
                &fDiscard, &GroupCode);
if (fGroupFound) {
    if (fDiscard) {
        // discard message
        return HRADIO_NOCONTINUE,
    }
    // Search driver data structure for group info
    relating to
    // the address this message came on and the group code
    // (returned by the AnalyzeMessage( ) above
    // if GroupCode is not found or it is disabled then
    // also discard the message
    if (!LocateAndCallFilterMessage (bMsgBuf, dwMsgSize,
            Address, GroupCode))
    {
        // discard message
        return HRADIO_NOCONTINUE;
    }
    // here buffer the message and return
    HRADIO_NOCONTINUER
    // if buffer full then return HRADIO_CONTINUE_VIDEO_OFF
} else {
    // treat as a normal page message (cause full wakeup,
    etc.)
    ...
    return HRADIO_CONTINUE_VIDEO_OFF;
}
```

1.1.9 Type Definitions
This section defines the types used in the driver API.
1.1.9.1 Basic Types
The following basic types are used:
BYTE Unsigned 8-bit
WORD Signed 16-bit
DWORD Signed 32-bit
1.1.9.2 Complex Types (structs)
All structures have the following three fields at the beginning:
  WORD wOperationCode
    Indicates what operations needs to be performed. This field also determines the rest of the struct.
  WORD wStructSize
    Each struct has fixed size fields followed by the length of the variable fields. The variable fields follow in the same order as their lengths. The wStructSize field holds the size in bytes of the fixed part of the struct (i.e., fixed fields and the lengths of the variable fields). This field provides a versioning method as well and will be used for backward compatibility in the future releases.

In addition, the variable length fields are grouped towards the end a length field for each one of them is provided. This allows expanding these structures without losing backward or forward compatibility.

1.1.9.3 struct HRADIO_REGISTER
This struct is used for registering a wakeup function.

| Size | Field |
| --- | --- |
| 2 | WOperationCode |
| 2 | WStructSize |
| 4 | DwMemPtr |
| 1 | Device |

WORD wOperationCode
  HAL_IOCTL_CMD_REGISTER_WAKEUP_FUNCTION
WORD wStructSize
  sizeof(HRADIO_REGISTER)
DWORD dwMemPtr
  Pointer to a memory block (RMB). The second DWORD of this memory block contains a pointer to the function that will be called by HAL during wakeup to determine if power on sequence should continue or not.
BYTE Device
  Device number (This is how HAL distinguishes one device's RMB from another).
1.1.9.4 struct HRADIO_FLAG
This struct use used for operations on the HAL flags.

| Size | Field |
| --- | --- |
| 2 | wOperationCode |
| 2 | wStructSize |
| 2 | wFlag |

WORD wOperationCode
  One for the following values:
    HRADIO_CMD_FLAG_SET
    HRADIO_CMD_FLAG_CLEAR
    HRADIO_CMD_FLAG_GET
WORD wStructSize sizeof(HRADIO_FLAG)
WORD wFlag A code indicating which HAL flags is affected by the requested operation. Values are:
    HRADIO_FLAG_VIDEO_STATE
    HRADIO_FLAG_SYSTEM_BUSY
1.1.9.5 struct HRADIO_LOCK
This struct use used for operations on locking and unlocking memory.

| Size | Field |
| --- | --- |
| 2 | wOperationCode |
| 2 | wStructSize |

-continued

| Size | Field |
|---|---|
| 4 | dwMemPtr |
| 4 | dwSize |

WORD wOperationCode
  One for the following values:
    HRADIO_CMD_LOCKPAGE
    HRADIO_CMD_UNLOCKPAGE
WORD wStructSize
  sizeof(HRADIO_LOCK)
DWORD dwMemPtr
  A virtual pointer to memory to be locked or unlocked.
DWORD dwsize
  The total number of bytes to be locked or unlocked.
1.1.10 HAL Flags
The following flags form part of the HAL:

| Flag | Type | Meaning |
|---|---|---|
| HAL_fVideoState | Bool | Set if the video is currently powered on, reset otherwise. Set on cold boot. (When the flag is set using HRADIO_CMD_FLAG_SET command, the video is turned ON. When it is reset, the video is turned off). |
| HAL_SystemBusy | Counter | This needs to be implemented as a counter (at least one byte). If non-zero, HAL will trap power off button to prevent system from shutting down. HRADIO_CMD_FLAG_SET command increments the counter, HRADIO_FLAG_CLEAR decrements it. Initialized to 0 on cold boot. |

1.1.11 HAL IOCTL calls
In Windows CE® systems, HAL supports IO Control calls to perform operations that are specific to their hardware. Most OEMs already implement the following IOCTL call for other services.
Syntax

```
BOOL OEMIOControl(
    DWORD dwCode
    PBYTE pBufIn
    DWORD dwLenIn
    PBYTE pBufOut
    DWORD dwLenOut
    PDWORD pdwActualOut
);
```

Parameters
dwCode
  Specifies a value indicating the I/O control operation to perform. The code used will be IOCTL_HAL_RADIO_CNTRL.
pBufIn
  Points to the buffer containing data that is input to the HAL.
dwLenIn
  Specifies the number of bytes of data in the buffer specified for pBufIn.
pBufOut
  Points to the buffer used to transfer the output data.
dwLenOut
  Specifies the maximum number of bytes in the buffer specified by pBufOut
pdwActualOut
  Points to DWORD buffer the function uses to return the actual number of bytes received from the device.
Return Value
Returns TRUE if the HAL successfully completed its specified I/O control operation, otherwise it returns FALSE.
1.1.11.1 HRADIO_CMD_REGISTER
Syntax

```
HRADIO_REGISTER CmdBuf;
HANDLE hRegister;
CmdBuf.wStructSize = sizeof(HRADIO_REGISTER);
CmdBuf.dwOperationCode = HRADIO_CMD_REGISTER;
CmdBuf.MemPtr = . . . ; (NULL for deregistering)
CmdBuf.Device = . . . ;
BOOL OemIOControl(
    DWORD dwCode = IOCTL_HAL_RADIO_CNTRL
    PBYTE pBufIn = &CmdBuf
    DWORD dwLenIn = sizeof(CmdBuf)
    PBYTE pBufOut = &hRegister
    DWORD dwLenOut = sizeof(HANDLE)
    PDWORD pdwActualOut = &dwWriteBytes
);
```

Operation
This call registers a radio memory block (RMB) that contains a pointer to the wakeup function that is called during HAL power on processing. If the MemPtr member is NULL then the call does de-registration. The output buffer returns a handle to the RMB (address of the HAL data structure where the device memory block was saved).
Remarks
The function supplied must be statically bound to the driver code and small enough to fit within a memory page.
1.1.11.2 HRADIO_CMD_FLAG_xxx
Syntax

```
HRADIO_FLAG CmdBuf;
CmdBuf.wStructSize = 8;
CmdBuf.wOperationCode = HRADIO_CMD_FLAG_xxx;
CmdBuf.wFlag = . . .
BOOL OemIOControl(
    DWORD dwCode = IOCTL_HAL_RADIO_CNTRL
    PBYTE pBufIn = &CmdBuf
    DWORD dwLenIn = sizeof(CmdBuf)
    PBYTE pBufOut = &dwOldFlagValues
    DWORD dwLenOut = sizeof(dwOldFlagValues)
    PDWORD pdwActualOut = &dwWriteBytes
);
```

Note: pBufOut, dwLenOut, and pdwActualOut are used for GET operation only. Set them to NULL for other operations.
Operation
The operation depends upon the operation code stored in dwOperationCode member and is described below:
  HAL_IOCTL_CMD_SET_FLAG
    If the indicated flag is a Boolean flag then set it to TRUE. If it is a counter flag, then increment it.

HAL_IOCTL_CMD_RESET_FLAG
  If the indicated flag is a Boolean flag then set it to FALSE. If it is a counter flag and is non-zero, then decrement it.

HAL_IOCTL_CMD_GET_FLAG
  Value of the indicated flag is returned in pBufOut. For simplicity, the flag value is always returned as a DWORD (so pBufOut must be large enough to hold at least one DWORD).

Additional processing for HRADIO_FLAG_VIDEO_STATE
  If the flag changes its state because of a set or a reset command, the video needs to be turned on or off to correctly reflect the new state of this flag. For example, if the HAL_fVideoState is 0 and a HAL_IOCTL_CMD_FLAG_SET is issued on this flag, then the video needs to be turned on. If the flag was already set to 1 (hence the video is already on), then this set command will have no effect and there is no need for any additional processing (the video is already ON).

Remarks

The HAL flags are accessible to the drivers directly (they don't need to make these IOCTL calls).

1.1.11.3 HRADIO_CMD_LOCKPAGE

Syntax

```
HRADIO_LOCK CmdBuf;
CmdBuf.wStructSize = 12;
CmdBuf.wOperationCode = HRADIO_CMD_LOCKPAGE;
CmdBuf.dwMemPtr = &buf;
CmdBuf.dwSize = sizeof(buf);
BOOL OemIOControl(
    DWORD dwCode = IOCTL_HAL_RADIO_CNTRL
    PBYTE pBufIn = &CmdBuf
    DWORD dwLenIn = sizeof(CmdBuf)
    PBYTE pBufOut = PHYSICAL ADDRESS OF LOCKED PAGE
    DWORD dwLenOut = sizeof(DWORD);
    PDWORD pdwActualOut = &dwWriteBytes
    );
```

Operation

This operation locks down the memory pointed to my dwMemPtr. The number of pages locked will be determined by the page size and the value of dwSize. The value returned will be the physical address of the first byte pointed to dwMemPtr. This value will normally be adjusted to be not cached and accessible at initial power on.

1.1.11.4 HRADIO_CMD_UNLOCKPAGE

Syntax

```
HRADIO_LOCK CmdBuf;
CmdBuf.wStructSize = 12;
CmdBuf.wOperationCode = HRADIO_CMD_UNLOCKPAGE;
CmdBuf.dwMemPtr = previous value returned from
    HRADIO_CMD_LOCKPAGE;
CmdBuf.dwSize = previous value used with
    HRADIO_CMD_LOCKPAGE;
BOOL OemIOControl(
    DWORD dwCode = IOCTL_HAL_RADIO_CNTRL
    PBYTE pBufIn = &CmdBuf
    DWORD dwLenIn = sizeof(CmdBuf)
    PBYTE pBufOut = NULL (not used)
    DWORD dwLenOut = 0 (not used)
```

-continued
```
    PDWORD pdwActualOut = &dwWriteBytes
    );
```

Operation

This operation unlocks the memory pointed to my dwMemPtr. The number of pages unlocked will be determined by the page size and the value of dwSize. This function is used to unlock previously locked memory.

1.1.12 HAL LCD Changes

The LCD initialization code needs to check the wakeup source and determine if the LCD should be turned on or not. If HAL_fVideoRequest flag is implemented, then the processing would be as follows:

```
if (HAL_fVideoRequest) {
    Continue normal initialization sequence (the LCD
    is turned on).
} else {
    Continue initialization sequence without actually
    powering on the LCD.
}
```

The LCD code also needs to correctly set HAL_fVideoState flag: TRUE when the LCD is powered ON, and FALSE when it is not.

1.1.13 HAL Touch Screen Considerations

If the touch screen can not be turned of when the video is turned off, then the touch interrupt should be ignored if the video is currently off (ie, HAL_fVideoState==FALSE). For devices that support the touch screen to turn on the device, then the video should be turned on, and the touch interrupt event should be discarded. This can be done by the following code:

```
if (HAL_fvideoState == FALSE) {
    HRADIO_FLAG CmdBuf;
    CmdBuf.wStructSize = sizeof(HRADIO_FLAG);
    CmdBuf.wOperationCode = HRADIO_CMD_FLAG_SET;
    CmdBuf.wFlag = HRADIO_FLAG_VIDEO_STATE;
    OemIOControl(IOCTL_HAL_RADIO_CNTRL,
            &CmdBuf, sizeof(CmdBuf)
            NULL, 0
            pdwActualOut = &dwWriteBytes
            );
}
```

Note that above is just an example code that uses an HAL IOCTL to turn on the video. It is possible that the code to turn on video is trivial (or is available as function) in which case that code can be used directly. No matter how this is done, care must be taken to ensure that HAL_fVideoState correctly reflects the true state of the video (ON=1 or OFF=0).

1.1.14 HAL Keyboard Considerations

1. When the HAL detects a key, it also needs to check HAL_fVideoState and if it is not set (i.e., video is currently not on) then it needs to turn on the video using the HAL IOCTL call (same code as in touch driver) and eats the key.

2. An additional change is required to implement the delayed power off feature. On every power off key press, do the following

```
if (HAL_SystemBusy &&
    (KeyPressed == KEY_POWER_OFF)) {
  Turn video off and ignore the key
  //see 0 for the sample code and
  //comment about HAL_fVideoState
}
```

1.1.15 OOM system Considerations

The OOM (out of memory message) code needs to check HAL_fVideoState and if it is not set (i.e., video is currently not on) then it needs to turn on the video using the HAL IOCTL call. It also needs to clear the HAL_SystemBusy flag.

Sample Code

```
HRADIO_FLAG CmdBuf;
CmdBuf.wStructSize = sizeof(HRADIO_FLAG);
CmdBuf.wOperationCode = HRADIO_CMD_FLAG_SET;
CmdBuf.wFlag = HRADIO_FLAG_VIDEO_STATE;
OemIOControl(
    IOCTL_HAL_RADIO_CNTRL,  // DWORD dwCode
    &CmdBuf,         // PBYTE pBufIn
    sizeof(CmdBuf),           // DWORD dwLenIn
    NULL,            // PBYTE pBufOut
    0,               // DWORD dwLenOut
    &dwWriteBytes    // PDWORD pdwActualOut
);
CmdBuf.wFlag = HRADIO_FLAG_SYSTEM_BUSY;
DWORD dwValue;
while (1) {
  // get the value of SystemBusy counter
  CmdBuf.wOperationCode = HRADIO_CMD_GET;
  if (OemIOControl (
      IOCTL_HAL_RADIO_CNTRL,  // DWORD dwCode
      &CmdBuf,         // PBYTE pBufIn
      sizeof(CmdBuf),           // DWORD dwLenIn
      &dwValue,        // PBYTE pBufOut
      sizeof(dwValue),          // DWORD dwLenOut
      &dwWriteBytes    // PDWORD pdwActualOut
  ) {
    if (dwValue == 0) {
      break;  // we are done
    }
    // decrement SystemBusy counter
    CmdBuf.dwOperationCode = HRADIO_CMD_CLEAR;
    if (!OemIOControl(
        IOCTL_HAL_RADIO_CNTRL,  // DWORD dwCode
        &CmdBuf,         // PBYTE pBufIn
        sizeof(CmdBuf),           // DWORD dwLenIn
        NULL,            // PBYTE pBufOut
        0,               // DWORD dwLenOut
        &dwWriteBytes    // PDWORD pdwActualOut
    ) {
      break;
    }
  }
}
```

1.1.16 OEM_Idle( ) Considerations

OEM_Idle( ) is called by the Windows CE® kernel when there are no more threads or tasks to execute. This function is expected to do a timeout (typically 1–5 minutes) and if no system activity is detected, the system is shutdown.

To implement the immediate shutdown feature, this function should check HAL_fvideoState flag. If it is clear (Vide( ) is off) then it does not need to do the idle timeout and should shutdown the system immediately.

1.1.17 Sample Code

1.1.17.1 HAL IOCTL Implementation

```
BOOL OEMIoControl(DWORD dwIoControlCode, LPVOID lpInBuf,
DWORD nInBufSize,
    LPVOID lpOutBuf, DWORD nOutBufSize, LPDWORD
lpBytesReturned) {
    BOOL retval = FALSE;
        DWORD len;
            DWORD PhysAddr, value;
            PHRADIO_LOCK pHalLock;
            LPHRADIO_REGISTER pHalReg;
            LPHRADIO_FLAG pHalFlag;
        switch (dwIoControlCode) {
            case IOCTL_HAL_RADIO_CNTRL:
                if (nInBufSize < sizeof(WORD)) {
                    SetLastError(ERROR_INVALID_PARAMETER);
                    break;
                }
                switch (*(LPWORD)lpInBuf) {
                    case HRADIO_CMD_LOCKPAGE:
                        if (nInBufSize <
sizeof(HRADIO_LOCK)) {
SetLastError(ERROR_INSUFFICIENT_BUFFER);
                            break;
                        }
                        pHalLock = (LPHRADIO_LOCK)lpInBuf;
                        if (LockPages((LPVOID)pHalLock-
>dwMemPtr, 1, &PhysAddr, 2)) {
                            memcpy (lpOutBuf, &PhysAddr,
sizeof(DWORD));
                            retval = TRUE;
                        }
                        break;
                    case HRADIO_CMD_REGISTER:
                        if (nInBufSize <
sizeof(HRADIO_REGISTER)) {
```

-continued

```
SetLastError(ERROR_INSUFFICIENT_BUFFER);
                                break;
                        }
                        pHalReg =
(LPHRADIO_REGISTER)lpInBuf;
                        if(pHalReg->Device != 1 &&
pHalReg->Device != 2) {
                                SetLastError(ERROR_BAD_DEVICE);
                                break;
                        }
                        if(pHalReg->Device == 1) {
                                REG32(OEM_BASE+RADIO1) =
UnMapPtr(pHalReg->dwMemPtr);
                        } else {
                                REG32(OEM_BASE+RADIO2) =
UnMapPtr(pHalReg->dwMemPtr);
                        }
                        if(!pHalReg->dwMemPtr) {
                            retval = TRUE;
                            break;
                        }
                        if(nOutBufSize < sizeof(DWORD)) {
SetLastError(ERROR_INSUFFICIENT_BUFFER);
                                break;
                        }
                        PhysAddr = pHalReg->Device == 1 ?
(OEM_BASE+RADIO1) : (OEM_BASE+RADIO2);
                        memcpy(lpOutBuf, &PhysAddr,
sizeof(DWORD));
                        retval = TRUE;
                        break;
                    case HRADIO_CMD_FLAG_SET:
                        if(nInBufSize <
sizeof(HRADIO_FLAG)) {
SetLastError(ERROR_INSUFFICIENT_BUFFER);
                                break;
                        }
                        pHalFlag = (LPHRADIO_FLAG)lpInBuf;
                        switch (pHalFlag->wFlag) {
                            case HRADIO_FLAG_VIDEO_STATE:
                                VideoOff();
                                break;
                            case HRADIO_FLAG_SYSTEM_BUSY:
                                // need to increment
because multiple devices
++REG32(OEM_BASE+RADIO_BUSY);
                                break;
                        }
                        retval = TRUE;
                        break;
                    case HRADIO_CMD_FLAG_CLEAR:
                        if (nInBufSize <
sizeof(HRADIO_FLAG)) {
SetLastError(ERROR_INSUFFICIENT_BUFFER);
                                break;
                        }
                        pHalFlag = (LPHRADIO_FLAG)lpInBuf;
                        switch (pHalFlag->wFlag) {
                            case HRADIO_FLAG_VIDEO_STATE:
                                VideoOn();
                                break;
                            case HRADIO_FLAG_SYSTEM_BUSY:
                                // need to increment
because multiple devices
                                if
(REG32(OEM_BASE+RADIO_BUSY)) {
                                    --
REG32(OEM_BASE+RADIO_BUSY);
                                }
                                break;
                        }
                        retval = TRUE;
                        break;
                    case HRADIO_CMD_FLAG_GET:
                        if (nInBufSize <
sizeof(HRADIO_FLAG)) {
SetLastError(ERROR_INSUFFICIENT_BUFFER);
                                break;
                        }
```

```
                                -continued if (nOutBufSize < sizeof(DWORD)) {
SetLastError(ERROR_INSUFFICIENT_BUFFER);
                                       break;
                               }
                               pHalFlag = (LPHRADIO_FLAG)lpInBuf;
                               value = 0;
                               switch (pHalFlag->wFlag) {
                                       case HRADIO_FLAG_VIDEO_STATE:
                                               value =
(DWORD)REG8(OEM_BASE+VIDEO_OFF);
                                               break;
                                       case HRADIO_FLAG_SYSTEM_BUSY:
                                               value =
REG32(OEM_BASE+RADIO_BUSY);
                                               break;
                               }
                               memcpy(lpOutBuf, &value,
sizeof(DWORD));
                               retval = TRUE;
                               break;
                       }
                       break;
       default:
               SetLastError(ERROR_NOT_SUPPORTED);
               break;
       }
       return retval;
}
```

1.1.17.2 HAL PowerOn Implementation

```
OEMPowerOn( )
       if (WakeupSource( )==CompactFlash_RI) {
               ret = HRADIO_CONTINUE_VIDEO_ON;
               if (RadioWakeupFunction != NULL) {
                       ret = RadioWakeupFunction(HalControlBlock);
               }
               if (ret == HRADIO_CONTINUE_VIDEO_ON) {
                       VideoInit(FALSE);
               } else
               if (ret == HRADIO_CONTINUE_VIDEO_OFF) {
                       VidoeInit(TRUE);
               } else
               GotToSleep( );
```

1.1.17.3 HAL Changes for LCD

```
               VideoInit(BOOL KeepVideoOff);
               VideoOn( );
               VideoOff( );
```

1.1.17.4 HAL Considerations for Keyboard

```
/* system already running */
if ((DWORD)REG8(OEM_BASE+VIDEO_OFF)) {
       if (IsWakeupKey(key)) {
               Video(on);
       }
       IgnoreKey( );
}
if (IsPowerDownKey(key)) {
       if (REG32(OEM_BASE+RADIO_BUSY)) {
               VideoOff( );
               IgnoreKey( );
       } else ProcessKey( );
}
```

1.1.17.5 HAL Considerations for Touch Screen

Same logic as keyboard changes described above.

1.1.17.6 HAL Considerations for OEM_Idle( )

```
               if VideoOff ( )
                       GoToSleep( );--.
```

Although the present invention has been described with reference to preferred embodiments, workers skilled in the art will recognize that changes may be made in form and detail without departing from the spirit and scope of the invention.

What is claimed is:

1. A computer implemented method for receiving wireless information on a portable computing device, the method comprising:

powering a wireless receiver only from a battery of the portable computing device;

receiving wireless information;

storing the wireless information in memory of the wireless receiver;

awaking a processor of the portable computing device when the wireless information fills a threshold of the memory available in the wireless receiver; and transferring the wireless information from the memory of the wireless receiver to memory of the portable computing device.

2. The method of claim 1 and further comprising analyzing the wireless information received from the wireless receiver with the processor of the portable computing device.

3. The method of claim 2 and further comprising powering another component of the portable computing device as a function of the wireless information received.

4. The method of claim 3 wherein said another component comprises a display.

5. The method of claim 4 and further comprising powering a keyboard of the portable computing device as a function of the wireless information received.

6. The method of claim 4 wherein the step of analyzing comprises analyzing a content of the wireless information.

7. The method of claim 6 wherein the step of analyzing comprises analyzing a wireless address associated with the wireless information.

8. The method of claim 7 wherein the wireless address includes a priority status entry indicating if priority messages are received thereon, and wherein the method further includes analyzing the priority status entry associated with the wireless information.

9. The method of claim 8 and further comprising powering another component of the portable computing device as a function of analyzing the priority status entry.

10. The method of claim 9 wherein said another component comprises a display.

11. The method of claim 10 and further comprising powering a keyboard of the portable computing device as a function of analyzing the priority status entry.

12. The method of claim 8 and further comprising selectively changing the priority status entry of the wireless address.

13. The method of claim 6 wherein the step of analyzing comprises analyzing a selected portion of the wireless information.

14. The method of claim 13 wherein the portable computing device includes an executable application, and wherein the step of analyzing comprises analyzing the wireless information as a function of information from the executable application.

15. The method of claim 1 wherein wireless information is received in accordance with a wireless address, and wherein the wireless address includes an operational status entry indicating if wireless information received thereon should be processed, and wherein storing the wireless information includes storing the wireless information in memory as a function of the operational status entry.

16. The method of claim 15 and further comprising selectively changing the operational status entry of the wireless address.

17. A wireless receiver for use in a portable computing device, the wireless receiver comprising:
a radio receiver for receiving wireless information;
memory for storing the wireless information and a list of wireless addresses for the portable computing device, wherein each address corresponds to selected information to be received, and wherein each address includes an associated operational status entry indicating enablement of the address; and
a processor for processing wireless information as a function of the status entry of the address the wireless information is received on.

18. The wireless receiver of claim 17 wherein the radio receiver, the memory and the processor are powered only from the portable computing device.

19. The wireless receiver of claim 17 wherein each address in the list of wireless addresses for the portable computing device includes a priority status entry indicating if priority messages are received thereon.

20. The wireless receiver of claim 17 wherein the memory stores a list of wireless addresses for the portable computing device, wherein each address corresponds to selected information to be received, and wherein each address includes a priority status entry indicating if priority messages are received thereon.

21. A computer implemented method for receiving wireless information on a portable computing device, wherein the wireless information is transmitted to the portable computing device with respect to wireless addresses, the method comprising:

providing a list of wireless addresses on the portable computing device, wherein each address corresponds to selected information to be received, and wherein each address includes an associated status entry indicating enablement of the address; and
selectively enabling and disabling the status entry for the wireless address to allow receipt of the corresponding information as a function of an operating parameter of the portable computing device.

22. The method of claim 21 wherein the step of selectively enabling and disabling includes enabling the status entry when the portable computing device is powered from a source other than a battery.

23. The method of claim 21 wherein the portable computing device comprises a mobile device.

24. The method of claim 21 wherein the portable computing device includes a wireless receiver, and the method further comprises:
powering the wireless receiver only from the portable computing device;
receiving wireless information on a wireless address; and
storing the wireless information in memory of the wireless receiver if status entry of the wireless address is enabled.

25. The method of claim 21 wherein the operating parameter is user adjustable.

26. A computer implemented method for receiving wireless information on a portable computing device, the method comprising:
receiving wireless information from a wireless receiver;
storing data information in memory indicative of the wireless information; and
awaking a processor of the portable computing device reading the data information in memory indicative of the wireless information and powering other components of the portable computing device as a function of the data information, wherein the step of awaking includes the processor executing a body of code to receive a value indicative of the data information, and wherein the value indicative of the data information includes a first value indicating no further processing is needed for the wireless information.

27. The method of claim 26 wherein the value indicative of the data information includes a second value indicating further processing is needed for the wireless information without another component.

28. The method of claim 26 wherein the value indicative of the data information includes a third value indicating further processing is needed for the wireless information with another component.

29. The method of claim 26 wherein the value indicative of the data information includes a second value indicating further processing is needed for the wireless information without at least one of a keyboard and a display.

30. The method of claim 26 wherein the value indicative of the data information includes a third value indicating further processing is needed for the wireless information with at least one of a keyboard and a display.

31. A wireless receiver for use in a portable computing device, the wireless receiver comprising:
a radio receiver for receiving wireless information;
memory for storing the wireless information and a list of wireless addresses for the portable computing device, wherein each address corresponds to selected information to be received, and wherein each address includes an associated operational status entry indicating enablement of the address;

a processor for processing the wireless information as a function of the operational status entry; and wherein the radio receiver, the memory and the processor are powered only from portable computing device.

32. The wireless receiver of claim 31 wherein each address in the list of wireless addresses for the portable computing device includes a priority status entry indicating if priority messages are received thereon.

33. A portable computing device for receiving wireless information, wherein the wireless information is transmitted to the portable computing device with respect to wireless addresses, portable computing device comprising:

memory for storing a list of wireless addresses, wherein each address corresponds to selected information to be received, and wherein each address includes an associated status entry indicating enablement of the address; and a processor selectively enabling and disabling the status entry for the wireless address to allow receipt of the corresponding information as a function of an operating parameter of the portable computing device.

34. The portable computing device of claim 33 wherein the processor receives user commands to selectively enable and disable a status entry.

35. The portable computing device of claim 33 wherein each address includes a priority status entry indicating if priority messages are received thereon.

36. A computer implement method for receiving wireless information on a portable computing device, wherein the wireless information is transmitted to the portable computing device with respect to wireless addresses, the method comprising:

providing a list of wireless addresses on the portable computing device, wherein each address corresponds to selected information to be received, and wherein each address includes an associated status entry indicating enablement of the address; and selectively enabling and disabling the status entry for the wireless address to allow receipt of the corresponding information as a function of an operating parameter of the portable computing device.

37. The method of claim 36 wherein the step of selectively enabling and disabling includes enabling the status entry when the portable computing device is powered from a source other than a battery.

38. The method of claim 36 wherein the portable computing device comprises a mobile device.

39. The method of claim 36 wherein the portable computing device includes a wireless receiver, and the method further comprises:

powering the wireless receiver only from the portable computing device;

receiving wireless information on a wireless address; and storing the wireless information in memory of the wireless receiver if status entry of the wireless address is enabled.

40. The method of claim 36 wherein the operating parameter is user adjustable.

41. A computer implemened method for receiving wireless information on a portable computing device, the method comprising:

receiving wireless information from a wireless receiver;

storing data information in memory indicative of the wireless information; and awaking a processor of the portable computing device reading the data information in memory indicative of the wireless information and powering other components of the portable computing device as a function of the data information, wherein the step of awaking includes the processor executing a body of code to receive a value indicative of the data information, and wherein the value indicative of the data information includes a first value indicating no further processing is needed for the wireless information.

42. The method of claim 41 wherein the value indicative of the data information includes a second value indicating further processing is needed for the wireless information without another component.

43. The method of claim 41 wherein the value indicative of the data information includes a third value indicating further processing is needed for the wireless information with another component.

44. The method of claim 41 wherein the value indicative of the data information includes a second value indicating further processing is needed for the wireless information with at least one of a keyboard and a display.

45. The method of claim 41 wherein the value indicative of the data information includes a third value indicating further processing is needed for the wireless information with at least one a keyboard and a display.

46. A wireless receiver for use in a portable computing device, the wireless receiver comprising:

a radio receiver for receiving wireless information;

memory for storing the wireless information and a list of wireless addresses for the portable computing device, wherein each address corresponds to selected information to be received, and wherein each address includes an associated operational status entry indicating enablement of the address;

a processor for processing the wireless information as a function of the operational status entry; and wherein the radio receiver, the memory and the processor are powered only from the portable computing device.

47. The wireless receiver of claim 46 wherein each address in the list of wireless addresses for the portable computing device includes a priority status entry indicating if priority messages are received thereon.

48. A portable computing device for receiving wireless information, wherein the wireless information is transmitted to the portable computing device with respect to wireless addresses, the portable computing device comprising:

memory for storing a list of wireless addresses, wherein each address corresponds to selected information to be received, and wherein each address corresponds to selected information to be received, and wherein each address includes an associated status entry indicating enablement of the address; and a processor selectively enabling and disabling the status entry for the wireless address to allow receipt of the corresponding information as a function of an operating parameter of the portable computing device.

49. The portable computing device of claim 48 wherein the processor receives user commands to selectively enable and disable a status entry.

50. The portable computing device of claim 48 wherein each address includes a priority status entry indicating if priority messages are received thereon.

51. The portable computing device of claim 48 wherein the wireless information comprises information packets, each information packet comprising a first portion having topic information indicative of content in a second portion of the information packet, and wherein the memory stores content filter data to ascertain if the information packet is to be discarded; and wherein the portable computing device further comprises a second processor for processing the second portion if the information packet is not discarded.

52. The portable computing device of claim 51 wherein the first-mentioned processor compares the first portion of the information packet to the content filter data as a function of the wireless address.

53. The portable computing device of claim 52 wherein the content filter data comprises a plurality of data tables, each data table being associated with a wireless address.

54. The portable computing device of claim 53 wherein each data table includes representations of at least one of a single, set or range of user preferences.

55. The portable computing device of claim 54 wherein each data table comprises a bit-array, wherein a status of each bit indicates a user preference for a selected type of information, and wherein the first-mentioned processor operates a hashing function upon the first portion to generate an offset value, and checks the status of the bit in the bit-array as a function of the offset value.

56. The portable computing device of claim 53 wherein each data table comprises information stored pursuant to a hashing function.

57. The portable computing device of claim 53 wherein the content filter data includes additional information stored as a function of the wireless address.

58. The portable computing device of claim 57 wherein the first-mentioned processor filters the second portion as a function of the additional information.

* * * * *